(12) United States Patent
Su et al.

(10) Patent No.: US 11,403,534 B2
(45) Date of Patent: Aug. 2, 2022

(54) ACQUIRING ENTITY WEBPAGE LINK BASED ON TOPOLOGICAL RELATIONSHIP GRAPH

(71) Applicant: Microsoft Technology Licensing, LLC, Redmond, WA (US)

(72) Inventors: Bai Su, Redmond, WA (US); Chao Ma, Redmond, WA (US); Changhai Zhou, Redmond, WA (US); Shujun Hua, Redmond, WA (US); Yuan Lu, Redmond, WA (US); Ning Wen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/047,046

(22) PCT Filed: May 13, 2019

(86) PCT No.: PCT/US2019/031915
§ 371 (c)(1),
(2) Date: Oct. 12, 2020

(87) PCT Pub. No.: WO2019/226371
PCT Pub. Date: Nov. 28, 2019

(65) Prior Publication Data
US 2021/0191951 A1 Jun. 24, 2021

(30) Foreign Application Priority Data
May 25, 2018 (CN) .......................... 201810516375.1

(51) Int. Cl.
*G06F 16/953* (2019.01)
*G06F 16/901* (2019.01)
*G06N 5/02* (2006.01)

(52) U.S. Cl.
CPC ......... *G06N 5/022* (2013.01); *G06F 16/9024* (2019.01); *G06F 16/953* (2019.01)

(58) Field of Classification Search
CPC .... G06N 5/022; G06F 16/953; G06F 16/9024
See application file for complete search history.

(56) References Cited

U.S. PATENT DOCUMENTS 6,549,896 B1 4/2003 Candan et al.
7,281,005 B2 10/2007 Canright et al.
(Continued)

FOREIGN PATENT DOCUMENTS

EP 3051433 A1 8/2016

OTHER PUBLICATIONS

Wang et al., Ontology-based Web Knowledge Management, Dec. 2003, School of Electrical and Electronic Engineering, Nanyang Technological University, all pages. (Year: 2003).*
(Continued)

*Primary Examiner* — Debbie M Le
*Assistant Examiner* — Antonio J Caiado
(74) *Attorney, Agent, or Firm* — Schwegman Lundberg & Woessner, P.A.

(57) ABSTRACT

The present disclosure discloses a chatbot with a stance taking. Opinions may be extracted from candidate replies during a processing of conversation, and the extracted opinions may be compared with the stance taken by the chatbot so as to perform selection on the candidate replies and remove the candidate replies which have conflicts with the stance taken by the chatbot. With such technical solutions, the stance taken by the chatbot may be exhibited.

20 Claims, 14 Drawing Sheets

(56) References Cited

U.S. PATENT DOCUMENTS

| | | | |
|---|---|---|---|
| 8,396,864 B1* | 3/2013 | Harinarayan | G06F 16/353 707/722 |
| 9,411,857 B1 | 8/2016 | Chechik et al. | |
| 9,652,504 B2 | 5/2017 | Aggarwal | |
| 9,697,475 B1 | 7/2017 | Subramanya et al. | |
| 2017/0147691 A1* | 5/2017 | Li | G06F 16/36 |
| 2018/0039696 A1* | 2/2018 | Zhai | G06F 16/35 |
| 2019/0121871 A1* | 4/2019 | Ikawa | G06F 16/958 |

OTHER PUBLICATIONS

Xin et al. Ontology-Based Hierarchical Conceptual Model for Semantic Representation of Events in Dynamic Scenes, 2005, National Laboratory of Pattern Recognition, Institute of Automation, Chinese Academy of Sciences, all pages. (Year: 2005).*

"Eros Ramazzotti", Retrieved From: https://web.archive.org/web/20200111061605/https://en.wikipedia.org/wiki/Eros_Ramazzotti, Jan. 11, 2020, 11 Pages.

"Germany National Football Team", Retrieved From: https://web.archive.org/web/20200103225035/https://en. wikipedia.org/wiki/Germany_national_football_team, Jan. 3, 2020, 18 Pages.

Guo, et al., "Robust Entity Linking via Random Walks", In The Proceedings of 23rd ACM International Conference on Information and Knowledge Management, Nov. 3, 2014, pp. 499-508.

Lao, et al., "Learning Relational Features with Backward Random Walks", In The Proceedings of 53rd Annual Meeting of the Association for Computational Linguistics and 7th International Joint Conference on Natural Language Processing of the Asian Federation of Natural Language Processing, vol. 1, Jul. 26, 2015, pp. 666-675.

Mazumder, et al., "Context-aware Path Ranking for Knowledge Base Completion", In Repository of: arXiv:1712.07745, Dec. 20, 2017, 7 Pages.

Pappu, et al., "Lightweight Multilingual Entity Extraction and Linking", In The Proceedings of Tenth ACM International Conference on Web Search and Data Mining, Feb. 6, 2017, pp. 365-374.

"International Search Report and Written Opinion Issued in PCT Application No. PCT/US19/031915", dated Aug. 9, 2019, 13 Pages.

Schuhmacher, Michael, "Knowledge Graph Exploration for Natural Language Understanding in Web Information Retrieval", In The Doctoral Dissertation for Obtaining the Academic Degree of Doctor of Science Submitted to The University of Mannheim, 2016, 154 Pages.

* cited by examiner ations and intelligent applications in the age of Internet by
using its strong semantics processing capability and open
information organizing capability. The knowledge graph
may be used for describing entities and the relationship
between the entities. With the developing and applying of
artificial intelligence technology, the knowledge graph has
been widely applied in the fields, such as intelligent search-
ing, intelligent QA, personalized recommendation and con-
tent distribution, as one of key technologies of artificial
intelligence.

ACQUIRING ENTITY WEBPAGE LINK BASED ON TOPOLOGICAL RELATIONSHIP GRAPH

CROSS-REFERENCE TO RELATED APPLICATION

This application is a U.S. National Stage Filing under 35 U.S.C. 371 of International Patent Application Serial No. PCT/US2019/031915, filed May 13, 2019, and published as WO 2019/226371 A1 on Nov. 28, 2019, which claims priority to Chinese Application No. 201810516375.1 filed May 25, 2018; which applications and publication are incorporated herein by reference in their entirety.

BACKGROUND

With the development of the Internet, the content of network data may be in a trend of explosive growing. The content on internet may have characteristics such as large scale, heterogeneous diversity and loose organization structure, which bring challenges in effectively acquiring information and knowledge by human beings. The knowledge graph has laid a foundation for knowledge-based organiza-

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

The embodiments of the present disclosure provide a technique for acquiring an entity webpage link based on a topological relationship graph, which may determine a weight value of a candidate entity webpage based on a topological relationship graph between webpages, and can fully exploit a correlation between the candidate entity webpage and a subject entity webpage, so as to improve the probability and accuracy in finding a value link.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
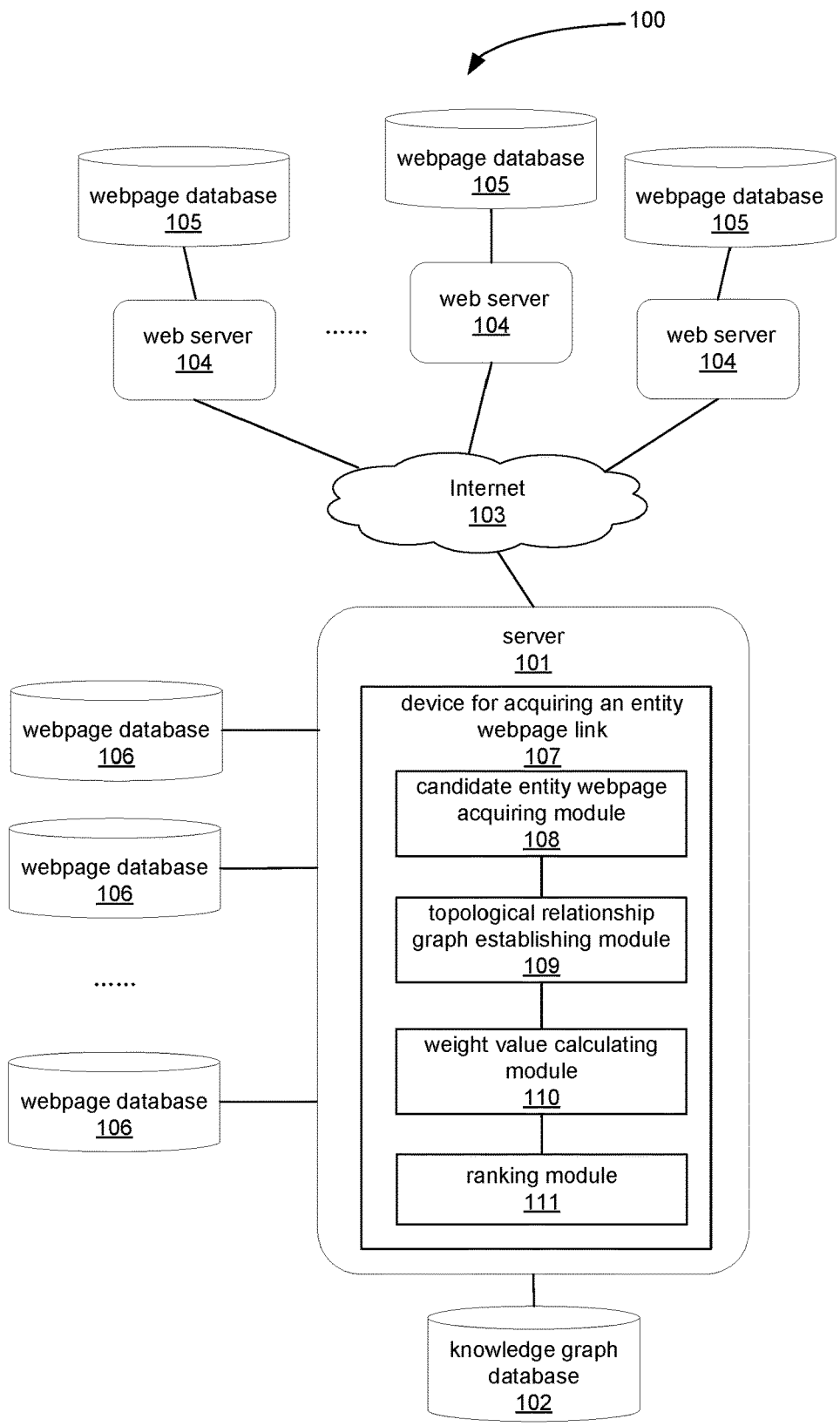
FIG. 1 is a block diagram showing an exemplary environment where a technique for acquiring an entity webpage link according to embodiments of the present disclosure is applied.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof.

In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

Overview

The embodiments of the present disclosure may be related to a technology of knowledge graph generated by extracting knowledge from webpage data in a website. The data in the knowledge graph may be typically in three-tuple. The three-tuple may store data in a form of Subject-Predicate-Object (SPO), which includes a subject, a predicate and an object. More particularly, the subject and the object may correspond to different entities respectively, while the predicate indicates a correlation between the two entities. It should be noted that in the field of knowledge graph, the subject, the predicate, and the object should be understood in a broad way, without being limited to the subject-predicate-object structure in the grammar structure. The subject, the predicate, and the object should be understood as having a relationship similar to a logical relationship between entities, which may be seen from the grammar structure of the subject-predicate-object. In some examples of definition, the SPO may be defined as: a subject, an attribute, and an object, or a subject, an attribute and an attribute value, and such two definitions may have same basic technological meaning.

In a knowledge graph generated by extracting on webpage data, the subject may include a webpage link corresponding to an entity, and the object may include: an object value (i.e., a name of the entity corresponding to the object, which may be referred as the object value hereafter), and a value link (a webpage link of the entity corresponding to the object) More particularly, the value may be used as a name corresponding to another entity, while the value link may be a webpage corresponding to the another entity. The predicate may store relationships between the subjects and the objects. Such relationships may be stored in a form of a coded character string or link.

During the extraction on the webpage data, there is possibility that the webpage corresponding to the entity corresponding to the part of the object is in a non-obvious way, and thus there may be some missing in the part of the value link, which may result in incomplete SOP data. Therefore, some information may be lacked in subsequent providing of specific services.

The technique for acquiring an entity webpage link based on a topological relationship graph provided in the embodiments of the present disclosure may acquire a value link based on a topological relationship graph between webpages and weight value ranking, and may fully exploit an association relationship between entity webpages, so as to improve the probability and accuracy in finding a value link, and further supplement the lacking of value link in the three-tuple data extracted from webpage data.

Illustrative Environment

The environment described below may merely construct an example without limiting claims of the present disclosure to any specific operating environment and other environment may be used without departing from the spirit and range as claimed by the present disclosure.

As shown in FIG. 1, which is a block diagram 100 showing an exemplary environment where a technique for acquiring an entity webpage link according to embodiments of the present disclosure is applied, a server 101 may be configured to obtain knowledge from massive webpages, generate a knowledge graph, and store the knowledge graph in a knowledge graph database 102.

More particularly, the sources of the webpages may be web servers 104 connected to the Internet 103. The server 101 may have access to each of the web servers 104 through web accessing interfaces provided by web servers 104 of third parties so as to acquire webpages and acquire knowledge. In the background of the each web server 104, there may be a corresponding webpage database 106. Furthermore, the webpages may be from the webpage database 106 of the same operating agency as the server 101, and the webpage database 106 may be regarded as an inner database by the server 101. The webpages cited herein may be not limited to webpages accessed via browsers, and may be various types of webpages accessed via APPs.

The above server 101 may be implemented in one or more computer systems (distributed server), or implemented as a server based on cloud technology or provided in a server based on cloud technology, which may be connected with user terminals or other third-party servers via internet to provide knowledge content service to users or third-party operating organizations.

As described above, the value link may be missed in the object part during extraction on webpage data. In view of such cases, a device for acquiring an entity webpage link 107 may be provided in the server 101 to help the server 101 to improve the establishing of the knowledge graph in the embodiments of the present disclosure.

The device for acquiring an entity webpage link 107 may include a candidate entity webpage acquiring module 108, a topological relationship graph establishing module 109, a weight value calculating module 110, and a ranking module 111.

The candidate entity webpage acquiring module 108 may be configured to perform searching for a plurality of candidate entity webpages associated with an object value, according to the object value. More particularly, the webpages stored in the webpage database may contain a considerable amount of anchor texts. The anchor texts may contain webpage links pointing from a current page to another webpage associated therewith. By performing a matching search on such anchor texts, an anchor text matched with the object value may be found so as to obtain a plurality of candidate entity webpages associated with the object value.

The candidate entity webpages are all webpages associated with the object value, but it may be unnecessary for the candidate entity webpages to be webpages corresponding to desired value links to be stored in the knowledge graph. More particularly, there may be following scenarios for a candidate entity webpage.

1) an entity corresponding to the acquired candidate entity webpage may be not the entity corresponding to an object in the SPO of an input knowledge graph. For example, an entity corresponding to a value of an object in the SPO may be a football player, while a candidate entity webpage found based on the anchor text may be a ski player with a name same as the name of football player.

2) a candidate entity webpage may be not the webpage describing the entity corresponding to the value of the object in detail, and may be only a webpage containing information related to the entity. Such webpage may not meet the requirements of the knowledge graph or may be undesirable for the knowledge graph. For example, a webpage may contain an anchor text of a movie star of "xxx", but the anchor text may point to a webpage describing a TV show in which the movie star is involved, or a webpage of an entertainment company which has signed a contract with the movie star, and in such webpages, the movie star may be involved in only a few contents of the webpages, rather than pointing to a webpage describing the movie star in detail. In order to establish a knowledge graph, it may be expected to find a webpage, which may be more related to the entity and describe the entity of the object more detailed.

3) a webpage describing the entity corresponding to the value of the object in the SPO in detail may be also a preferable webpage required by the knowledge graph. The technical solution proposed in the embodiments of the present disclosure is to find an entity webpage of the third type as described above.

The topological relationship graph establishing module 109 may be configured to establish a topological relationship graph between a subject entity webpage and the plurality of candidate entity webpages. Upon finding the plurality of candidate entity webpages, the candidate entity webpage acquiring module 108 may establish a topological relationship graph between the subject entity webpage and the candidate entity webpages. The topological relationship graph may be used to find out an association relationship between the subject entity webpage and each of the candidate entity webpages. The association relationships may be embodied in a relationship between the paths of the topological relationship graphs. The topological relationship graph from a subject entity webpage to a plurality of candidate entity webpages may include a forward topological relationship graph and/or a plurality of backward topological relationship graphs.

The forward topological relationship graph refers to a topological relationship graph from a subject entity webpage to a plurality of candidate entity webpages. In the forward topological relationship graph, the subject entity webpage is a head node, and the plurality of candidate entity webpages are sink nodes.

The backward topological relationship graph refers to a topological relationship graph from a candidate entity webpage to a subject entity webpage. In general, there are a plurality of candidate entity webpages, and thus there are also a plurality of backward topological relationship graphs. In the backward topological relationship graph, the candidate entity webpages are head nodes, and the subject entity webpage is a sink node.

The weight value calculating module 110 may be configured to calculate weight values of the candidate entity webpages according to a path relationship between the candidate entity webpages and the subject entity webpage in the topological relationship graph. Upon the topological relationship graph establishing module 109 generates the topological relationship graph, the weight values of the candidate entity webpages may be obtained by calculation based on the path relationship in the topological relationship graph. The calculation for weight values may be performed by random walking. More particularly, an initial weight value may be allocated to the head node in the topological relationship graph, and then random walking may be performed for a plurality of turns so as to perform the allocation of the weight values according to outdegrees of the nodes during each turn of the random walking. After the plurality of turns of random walking, the weight values obtained at the sink nodes in the topological relationship graph may be used as the weight values of the candidate entity webpages.

It should be noted that, in the forward topological relationship graph, the sink nodes are the candidate entity webpages, and after the random walking is completed, the weight values obtained at the sink nodes may be used as the weight values of the candidate entity webpages. In the backward topological relationship graph, the sink node is the subject entity webpage, and after the random walking is completed, the weight values obtained at the sink nodes may be still used as the weight values of the candidate entity webpages. In the case that the candidate entity webpages are retrieved by using both the forward topological relationship graph and the backward topological relationship graph, the weight values of the candidate entity webpages may be obtained by the calculation based on the forward topological relationship graph and the backward topological relationship graph respectively, and then for each candidate entity webpage, the weight value obtained based on the forward topological relationship graph and the weight value obtained based on the backward topological relationship graph are added together to obtain a final weight value.

Furthermore, the random walking is performed turn by turn, the initial weight value may be assigned to the head node, and the topological relationship graph is established from the head node as the beginning. Therefore, the random walking may be synchronized with the generation of the topological relationship graph.

The ranking module 111 may be configured to perform ranking according to the weight values of the candidate entity webpages, and determine a value link corresponding to the object value according to the ranking result. After the candidate entity webpages are obtained, ranking may be performed on the candidate entity webpages according to the weight values thereof, and links of one or more candidate entity webpages on the top may be selected as the value links corresponding to the object values in the knowledge graph.

In the above processing, the established topological relationship graph has acquired the association relationships between the subject entity webpage and the candidate entity webpages, and the forward topological relationship graph reflects a forward association relationship between the subject entity webpage and the candidate entity webpages, while the backward topological relationship graph reflects a backward association relationship between the subject entity webpage and the candidate entity webpages, so that more comprehensive evaluation may be made on the association relationships between the candidate entity webpages and the subject entity webpage. In addition, the association degree between the candidate entity webpages and the subject entity webpage may be quantified more comprehensively by calculating the weight values of the candidate entity webpages by random walking, so that more suitable candidate entity webpages may be selected according to the rankings of the weight values.

Detailed description may be made on the above processing of the topological relationship graph establishing processing, the weight value assigning, and the ranking respectively with respect to the forward topological relationship graph and the backward topological relationship graph in the below.

Establishing Forward Topological Relationship Graph

The forward topological relationship graph is a topological relationship graph beginning from a subject entity webpage to a plurality of candidate entity webpages. Nodes in the forward topological relationship graph may be corresponding to different entity webpages. More particularly, the subject entity webpage may be used as a head node, the candidate entity webpages may be used as sink nodes, nodes other than the head node and the sink nodes may be intermediate nodes. The intermediate nodes may be corresponding to intermediate entity webpages other than the subject entity webpage and the candidate entity webpages. There may be two cases for such intermediate nodes: one is that the intermediate nodes are on linking paths between the head node and the sink nodes, and the intermediate entity webpages directly or indirectly point to the candidate entity webpages, and the other is that the intermediate nodes are not on the linking paths between the head node and the sink nodes, and the intermediate entity webpages may be considered as webpages irrelevant to the topological relationship between the subject entity webpage and the candidate entity webpages. In order to facilitate description, the head node, the intermediate nodes, and the sink nodes in the forward topological relationship graph may be referred as a first node, first intermediate nodes and first sink nodes respectively hereinafter.

The generating the forward topological relationship graph may be performed as follows: using the subject entity webpage as the first head node; capturing a plurality of intermediate entity webpages pointed by the subject entity webpage and/or the candidate entity webpages starting from the subject entity webpage, and further capturing one or more new intermediate entity webpages and/or the candidate entity webpages from the captured intermediate entity webpages. More particularly, other webpages pointed by the subject entity webpage or the anchor texts in the intermediate entity webpages may be obtained by using the subject entity webpage or the anchor texts in the intermediate entity webpages; and repeating the above processing, until a preset first capturing turn is arrived and/or a preset first number of paths from the subject entity webpage to the candidate entity webpages are formed. More particularly, the intermediate entity webpages may be used as the first intermediate nodes, and the candidate entity webpages may be used as the first sink nodes.

Considering the efficiency and the effectiveness of the topological relationship graph, the number of turns for capturing webpages may be limited. In a specified turn, if a relationship of a path from the subject entity webpage to a candidate entity webpage is not established, the candidate entity webpage may be discarded. In addition, the process of capturing webpages may be terminated upon a part of path links from the subject entity webpage to the candidate entity webpages has been established, and other candidate entity webpages to which the path links from the subject entity webpage have not been established may be discarded.

In addition, in order to avoid infinite loops of subsequent random walking, in the process of establishing the forward topological relationship graph, links of the webpages pointing to the head node may be removed. Furthermore, in order to enable the random walking to converge quickly, returning edges pointing to sink nodes themselves corresponding to the candidate entity webpages may be added on the sink nodes, so as to enable the random walking to be terminated at the sink nodes.

Random Walking Based on Forward Topological Relationship Graph

Upon completing establishing the forward topological graph or along with the process of establishing the forward topological relationship graph, the weight values of the candidate entity webpages may be calculated by random walking. More particularly, an initial first weight value may be first assigned to the above first head node, weight value assignment is performed by random walking according to outdegrees of the nodes, until a preset first walking turn number is arrived and/or weight values are assigned to the sink nodes, and the weight values of the first sink nodes when the random walking is finished may be acquired as the weight values of the candidate entity webpages.

Weight Value Ranking Obtained Based on Forward Topological Relationship Graph

Upon the weight values of the candidate entity webpages are obtained, ranking may be made on the candidate entity webpages according to the weight values thereof, so that the webpage links of the candidate entity webpages on top may be selected as the value links of the object in the SPO.

Example of Processing Based on Forward Topological Relationship Graph

Figure 2:
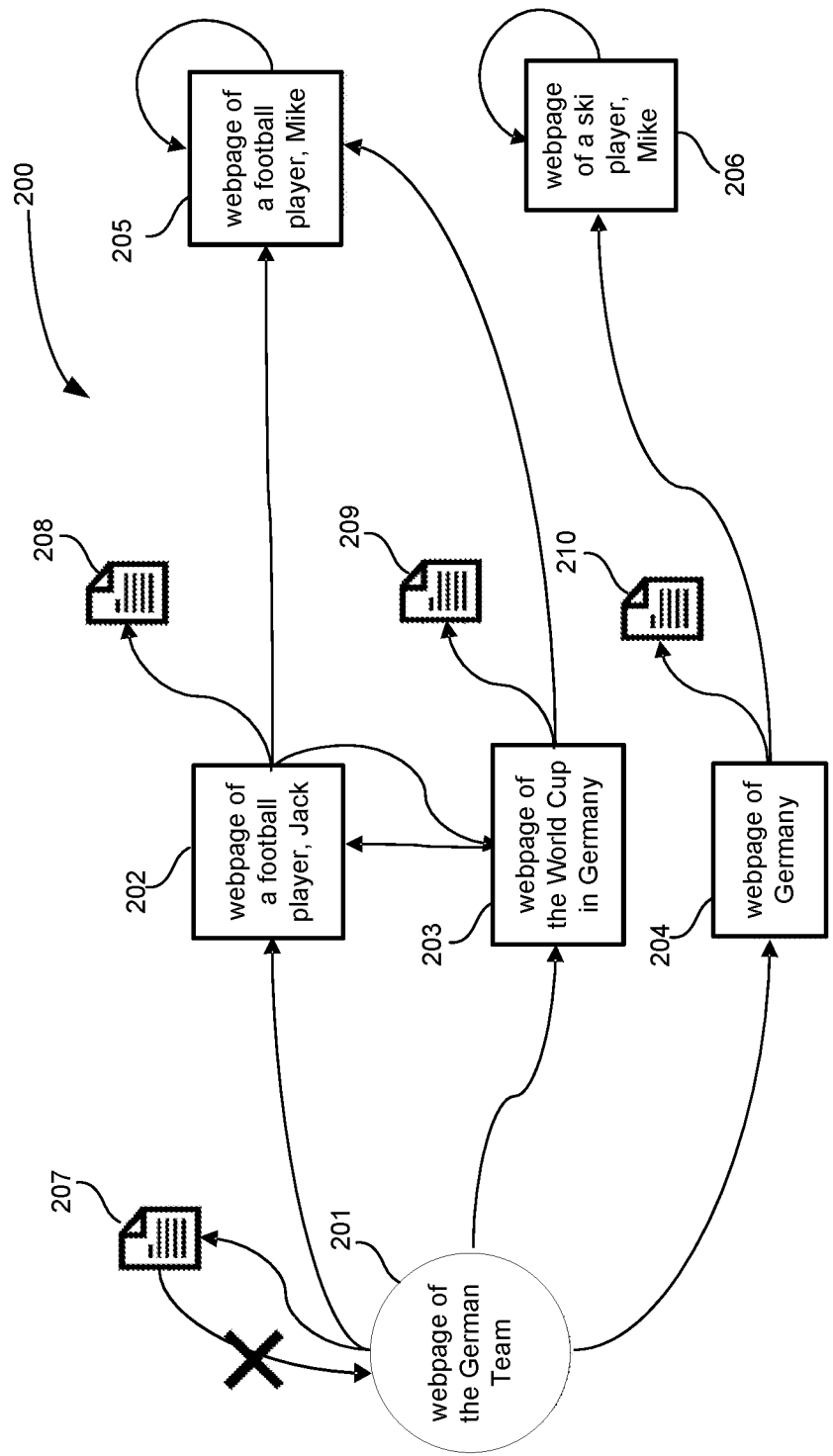
FIG. 2 is an exemplary block diagram of a structure of a forward topological relationship graph according to embodiments of the present disclosure.

Description may be made on a processing procedure based on the forward topological relationship graph below with a specific example, as shown in FIG. 2, which is an exemplary block diagram 200 of a structure of a forward topological relationship graph according to embodiments of the present disclosure. The specific establishing process may be as follows.

Stage A: Inputting SPO Information as Follows:

Subject: a webpage of the German National Football Team (hereinafter referred to as the German Team). The entity corresponding to the subject is the German Team.

Object: the object value may be a webpage of a football player named Mike (referred as the football player, Mike, in the figure), and the value link is missing.

Predicate (relationship between the subject and the object): the football player serves for the German Team.

In view of the above SPO information, the technical solution herein is to obtain the missed value link, i.e., to find the webpage describing the football player, Mike.

Stage B: Finding Candidate Entity Webpages

In a webpage database, a matching searching may be performed in the anchor text of each webpage with the Mike as the keyword to obtain candidate entity webpages associated with Mike. As shown in the figure, the found candidate entity webpages may be a webpage of a football player named Mike (shown as a webpage 205 of the football player, Mike, in the figure), and a webpage of a ski player also named as Mike (shown as a webpage 206 of the ski player, Mike, in the figure).

Stage C: Establishing a Forward Topological Relationship Graph

Webpages are captured from a webpage 201 of the German Team as a start, and after two turns of webpages capturing, a topological structure is generated, as shown in FIG. 2. The webpage 201 of the German Team may be the first head node, the webpage 205 of the football player, Mike, and the webpage 206 of the ski player, Mike, are first sink nodes, and other webpages are first intermediate nodes.

In order to simplify the example, specific webpage names are only assigned to the intermediate entity nodes on the link paths between the head node and the sink nodes, and the intermediate entity nodes which are not on the link paths between the head node and the sink nodes are only shown as text icons in the figures, and are just referred as webpages hereinafter.

More particularly, in a webpages capturing of first turn, a webpage 202 of a football player, Jack, a webpage 203 of the World Cup in Germany, a webpage 204 of Germany (a webpage introducing Germany), and a webpage 207 are captured according to the anchor text of the webpage 201 of the German Team. The webpages captured in the first turn are all intermediate entity webpages.

Then in webpages capturing of second turn, the webpage 205 of the football player Mike, a webpage 208, and the webpage 203 of the World Cup in Germany are captured according to the anchor text of the webpage 202 of the football player, Jack, the webpage 205 of the football player Mike, a webpage 209, the webpage 202 of the football player, Jack, are captured according to the anchor text of the webpage 203 of the World Cup in Germany, and the webpages 206 and 210 of the ski player, Mike, are captured according to the webpage 204 of Germany. The webpage 208, the webpage 209, and the webpage 210 are all intermediate entity webpages.

In addition, in order to avoid infinite loops of subsequent random walking, a webpage edge pointing from the webpage 207 to the webpage 201 of the German Team is removed. Furthermore, in order to enable the random walking to converge quickly, a return edge pointing to the webpage 205 of the football player Mike and a return edge pointing to the webpage 206 of the skier Mike are added on these two webpages respectively, so as to enable the random walking to be terminated at the first sink nodes.

Figure 3:
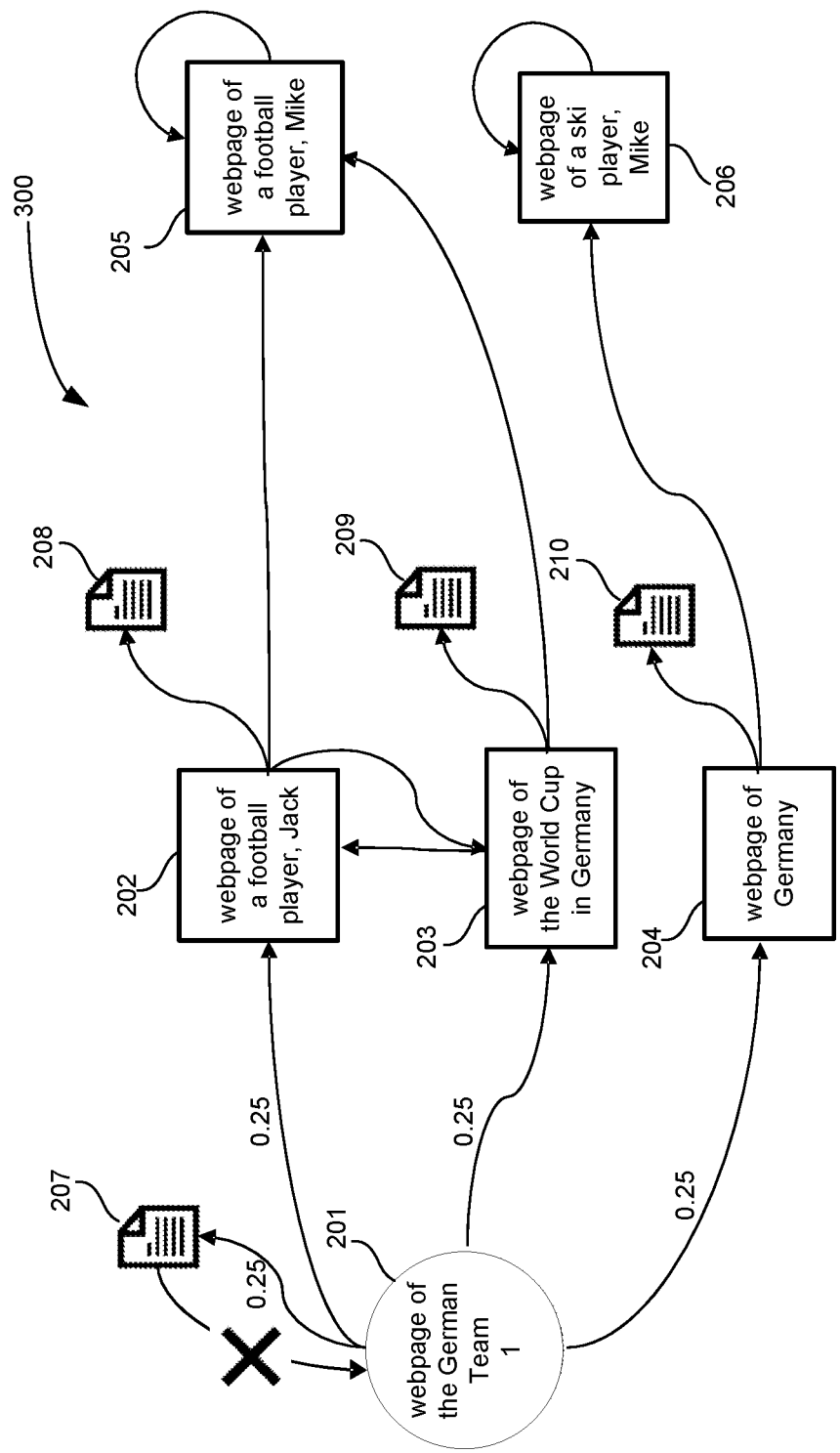
FIG. 3 is an exemplary block diagram of a random walking of the first turn based on a forward topological relationship graph according to embodiments of the present disclosure.

Stage D: Random Walking: Calculating the Weight Values of the Candidate Entity Webpages As shown in FIG. 3, which is an exemplary block diagram 300 of a random walking of first turn based on a forward topological relationship graph according to embodiments of the present disclosure, FIG. 4, which is an exemplary block diagram 400 of a random walking of second turn based on a forward topological relationship graph according to embodiments of the present disclosure, and FIG. 5, which is an exemplary block diagram 500 of a random walking result based on a forward topological relationship graph according to embodiments of the present disclosure, in order to facilitate visually showing the above weight value assigning processing, the numbers attached to the arrows in the figures may refer to weight values assigned in the outdegree directions corresponding to the arrows in the present turn and the numbers shown in the boxes or circles of the webpages may refer to weight values obtained in the present turn. In addition, in the random walking of each turn, only initial weight values of webpages and weight values assigned in the outdegree directions in this turn may be shown in the FIGS., but weight values obtained by the webpages when the random walking of the present turn is finished may be not shown in the FIGS. When the random walking of the present turn is finished, the weight values obtained for the webpages may be used as the initial weight values of the webpages in the random walking of the next turn, and therefore may be marked in the schematic diagram of the random walking of next turn.

In the random walking of the first turn (as shown in FIG. 3), starting from the first head node, an initial weight value of 1 is assigned to the webpage 201 of the German Team, and weight values are equally assigned to the webpage 202 of the football player, Jack, the webpage 203 of the World Cup in Germany, the webpage 204 and the webpage 207 of Germany to which the webpage 201 of the German Team is pointed according to the outdegree of the webpage 201 of the German Team. As shown in the figure, the outdegree of the webpage 201 of the German Team is 4, and a weight value of 0.25 is assigned in each outdegree direction thereof. Therefore, the webpage 202 of the football player, Jack, the webpage 203 of the World Cup in Germany, the webpage 204 and the webpage 207 of Germany may obtain a weight value of 0.25 in the random walking of the first turn. In addition, in the forward topological relationship graph, initial weight value is assigned to the webpage 201 of the German Team, while none of other webpages has a weight value. Therefore, there is no way to assign weight values to other webpages.

Figure 4:
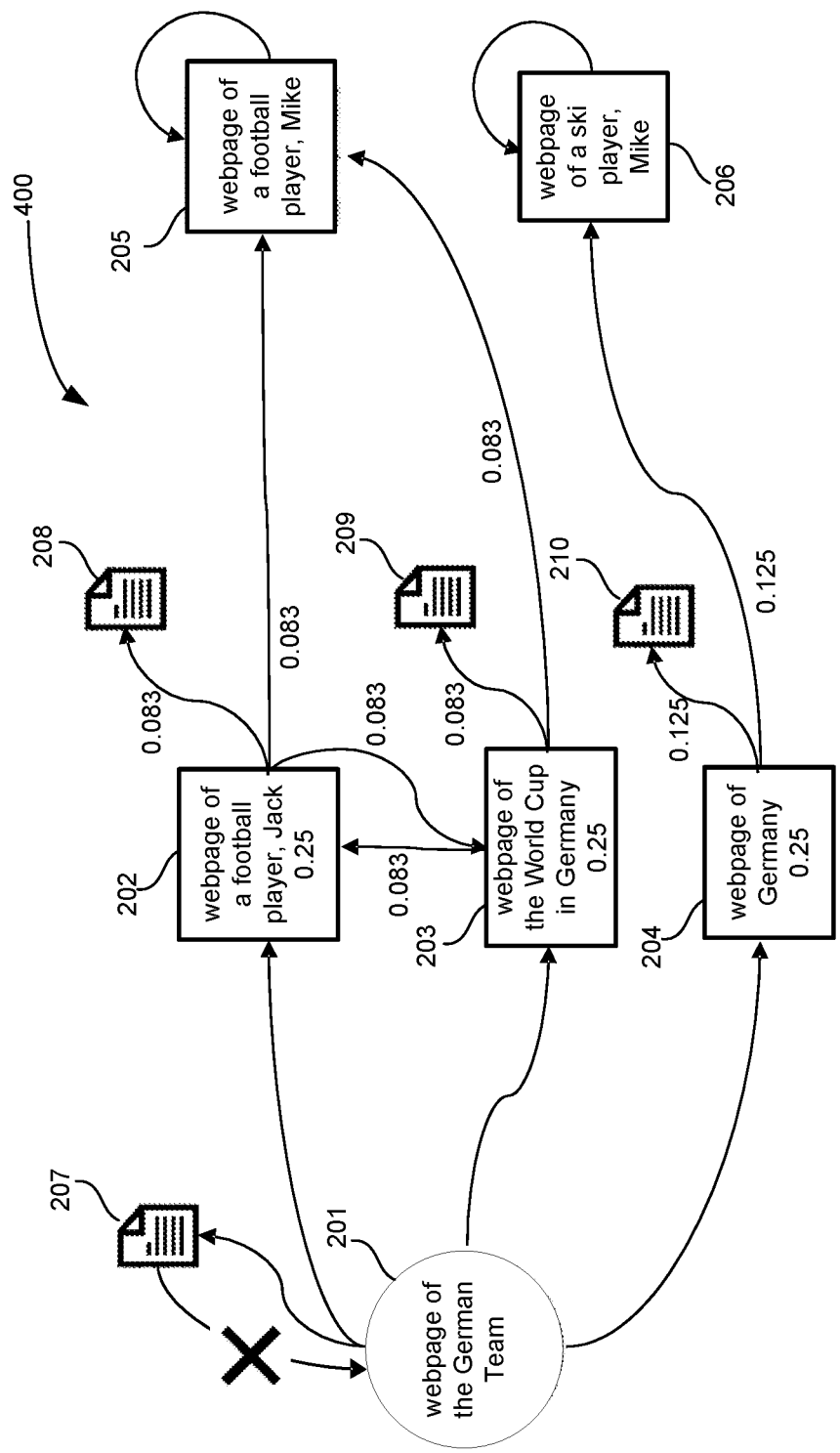
FIG. 4 is an exemplary block diagram of a random walking of the second turn based on a forward topological relationship graph according to embodiments of the present disclosure.

In the random walking of the second turn (as shown in FIG. 4), assigning of weight values may be further performed with the weight values obtained for the webpages when the random walking of the first turn is finished as the initial weight values of the random walking of the second turn. As shown in FIG. 4, in the random walking of the second turn, an initial weight value of the webpage 201 of the German Team is 0, and the initial weight values of the webpage 202 of the football player, Jack, the webpage 203 of the World Cup in Germany, the webpage 204 and the webpage 207 of Germany (the obtained initial weight values thereof are shown in the figure) are 0.25. Because a return edge from the webpage 207 to the webpage 201 of the German Team has been removed, the webpage 207 cannot assign a weight value to the webpage 201 of the German Team. The webpage 202 of the football player, Jack, may assign a weight value of 0.083 to the webpage 208, the webpage 205 of the football player, Mike, and the webpage 203 of the World Cup in Germany respectively according to the outdegree thereof. The webpage 203 of the World Cup in Germany may assign a weight value of 0.083 to the webpage 209, the webpage 202 of the football player, Jack, and the webpage 205 of the football player, Mike respectively according to the outdegree thereof. The webpage 204 of Germany may assign a weight value of 0.125 to the webpage 210, and the webpage 206 of the ski player, Mike, respectively according to the outdegree thereof. Finally, after the random walking of the second turn, the webpage 202 of the football player, Jack, may obtain a weight value of 0.083, the webpage 203 of the World Cup in Germany may obtain a weight value of 0.083, the webpage 205 of the football player, Mike, may obtain a weight value of 0.166, and the webpage 206 of the ski player, Mike, may obtain a weight value of 0.125.

Figure 5:
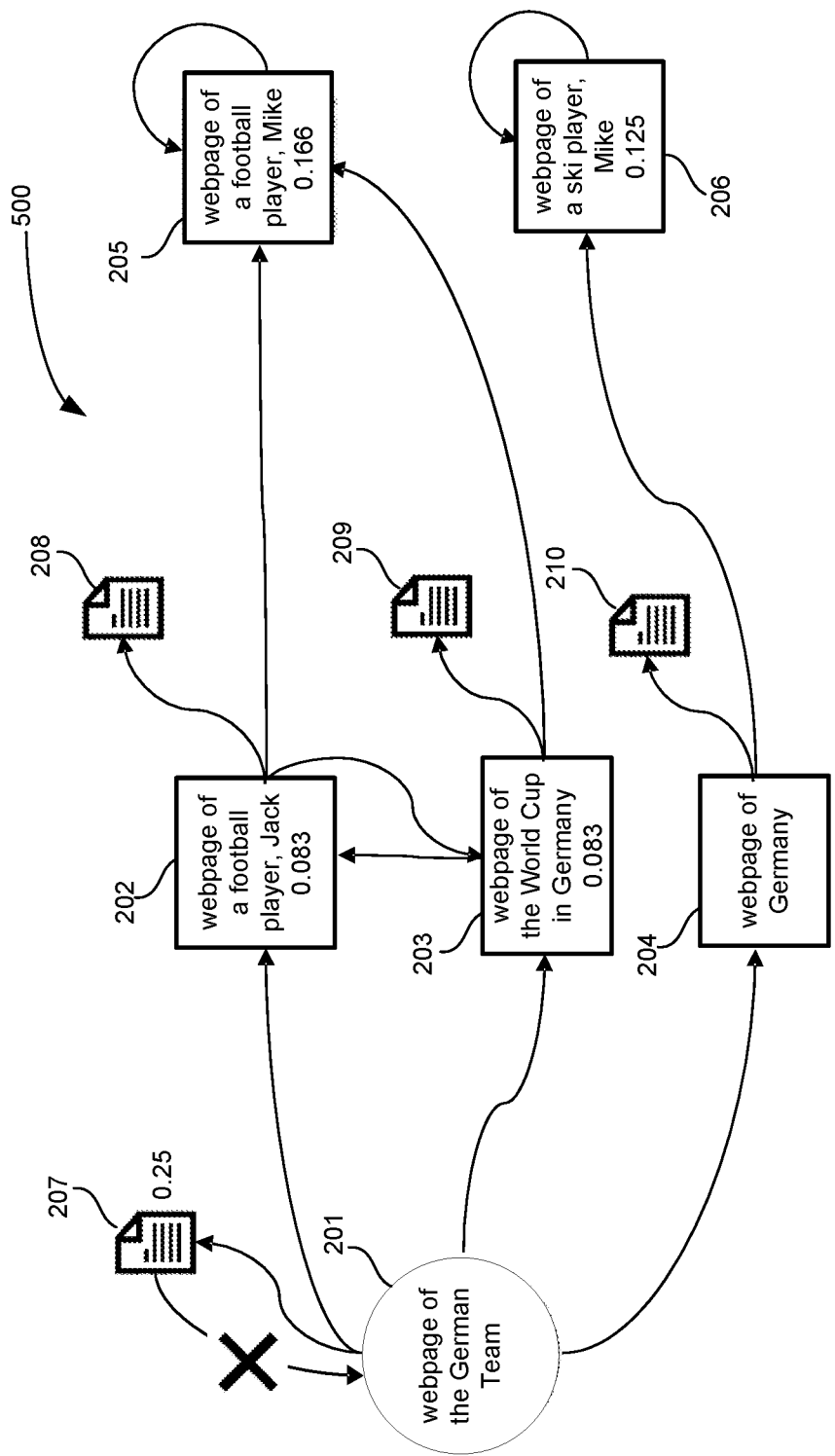
FIG. 5 is an exemplary block diagram of a result of random walking based on a forward topological relationship graph according to embodiments of the present disclosure.

The results obtained after two turns of random walking may be as follows as shown in FIG. 5. After the second turn of random walking is finished, the weight values of both the webpage 202 of the football player, Jack, and the webpage 203 of the World Cup in Germany, which may be used as the intermediate entity webpages, are 0.083. The weight values of the webpage 205 of the football player, Mike and the webpage 206 of the ski player, Mike, which may be used as the candidate entity webpages, are 0.166 and 0.125 respectively.

If the number of the turns for random walking is set as two, the weight values obtained for the candidate entity webpages may be the result shown in FIG. 5.

If the number of the turns for random walking is set as three, then the random walking may be further performed for one turn based on the weight value assigning shown in FIG.

5. During the random walking of this turn, the initial weight values of both the webpage 202 of the football player, Jack and the webpage 203 of the World Cup in Germany are 0.083, and the assigning of weight values may be further performed according to their respective outdegrees. Because a return edge pointing to the webpage 205 of the football player, Mike and a return edge pointing to the webpage 206 of the ski player, Mike are further added to these two webpages respectively, these two webpages may assign no weight values to other webpages any more, and the weight values obtained in the last turn may be accumulated. Finally, after the random walking of the third turn, the webpage 205 of the football player, Mike, obtains a weight value of 0.028 (0.0083÷3≈0.028) assigned by the webpage 202 of the football player, Jack, and a weight value of 0.028 (0.0083÷3≈0.028) assigned by the webpage 203 of the World Cup in Germany, together with the weight value of 0.166 obtained in the random walking of the second turn, so that the weight value of the webpage 205 of the football player, Mike becomes 0.222. In the random walking of the third turn, the webpage 206 of the ski player, Mike fails to obtain a new weight value, and has the final weight value of 0.125.

Stage E: Weight Value Ranking Obtained Based on Forward Topological Relationship Graph No matter the random walking is performed for two turns or three turns, after ranking, the weight value obtained for the webpage 205 of the football player, Mike, is more than the weight value obtained for the webpage 206 of the ski player, Mike. Therefore, the webpage link of the webpage 205 of the football player, Mike, may be selected as the value link missed in the above knowledge graph.

As can be seen from this example, regarding the relationship of paths, the direct or indirect association relationship between the webpage 205 of the football player, Mike, and the webpage 201 of the German Team may be more than the webpage 206 of the ski player, Mike. Therefore, the webpage 205 of the football player, Mike, may be regarded as being more suitable to be used as the value link of the object in the above SPO. Such result is also consistent with the fact.

Description may be made on the processing procedure based on the backward topological relationship graph below.

Establishing Backward Topological Relationship Graph

The backward topological relationship graph may be a topological relationship graph from each candidate entity webpage to a subject entity webpage. There may be a plurality of backward topological relationship graphs, and the number thereof may generally correspond to the number of candidate entity webpages. The generating a backward topological relationship graph may similar with the technical idea of the processing of generating a forward topological relationship graph, except that the direction for establishing the topological relationship graph may be opposite to each other.

In the backward topological relationship graph, the candidate entity webpages are head nodes, and the subject entity webpage is a sink node. Nodes other than the head nodes and the sink node are intermediate nodes, and the intermediate nodes may be corresponding to intermediate entity webpages other than the subject entity webpage and the candidate entity webpages. There may be two scenarios for the intermediate nodes: one is that the intermediate nodes are on link paths between the head nodes and the sink node, and the intermediate entity webpages directly or indirectly point to the subject entity webpage, and the other one is that the intermediate nodes are not on the link paths between the head nodes and the sink node, and the intermediate entity webpages may be considered as webpages irrelevant to the topological relationship between the candidate entity webpages and the subject entity webpage. In order to be distinguished from the nodes in the forward topological relationship graph, the head nodes, the intermediate nodes, and the sink node in the backward topological relationship graph may be referred as second head nodes, second intermediate nodes and a second sink node respectively hereinafter.

The generating the backward topological relationship graph may be as follows: using the candidate entity webpages as the second head nodes; capturing a plurality of intermediate entity webpages indicated by the candidate entity webpages or the subject entity webpage from the second head nodes, and then further capturing one or more new intermediate entity webpages and/or the subject entity webpage from the captured intermediate entity webpages. More particularly, other webpages to which the candidate entity webpages or the anchor texts in the intermediate entity webpages point may be obtained through the candidate entity webpages or the anchor texts in the intermediate entity webpages; repeating the above processing, until a preset second capturing turn number is arrived and/or a preset second number of paths from the candidate entity webpages to the candidate entity webpages are formed. More particularly, the intermediate entity webpages may be used as the second intermediate nodes, and the subject entity webpage may be used as the second sink node.

Considering the efficiency and the effectiveness of the topological relationship graph, the number of the turns for capturing webpages may be limited. In a specified turn, if a relationship of a path from a candidate entity webpage to the subject entity webpage is not established, that candidate entity webpage may be discarded.

In addition, in order to avoid infinite loops of subsequent random walking, during the backward topological relationship graph is established, links of the webpages pointing to the head node may be removed. Furthermore, in order to enable the random walking to converge quickly, returning edges pointing to sink nodes themselves corresponding to the candidate entity webpages may be added on the sink nodes, so as to enable the random walking to be terminated at the sink nodes.

Random Walking Based on Backward Topological Relationship Graph

Upon completing establishing the backward topological graph or along with the process of establishing the backward topological relationship graph, the weight values of the candidate entity webpages may be calculated by random walking.

More particularly, an initial second weight value may be first assigned to the second head node based on the backward topological graphs, and weight value assignment is performed by random walking according to outdegrees of the nodes, until a preset second walking turn number is arrived and/or weight values are assigned to the second sink nodes, and the weight values of the second sink nodes when the random walking based on the backward topological graph is finished may be acquired as the weight values of the candidate entity webpages in the backward topological graphs.

Weight Value Ranking Obtained Based on Backward Topological Relationship Graph

Upon the weight values of the candidate entity webpages are obtained based on the backward topological graphs, ranking may be made on the candidate entity webpages according to the weight values thereof, so that the webpage links of the candidate entity webpages on top may be selected as the value links of the object in the SPO.

Example of Processing Based on Backward Topological Relationship Graph

Figure 6:
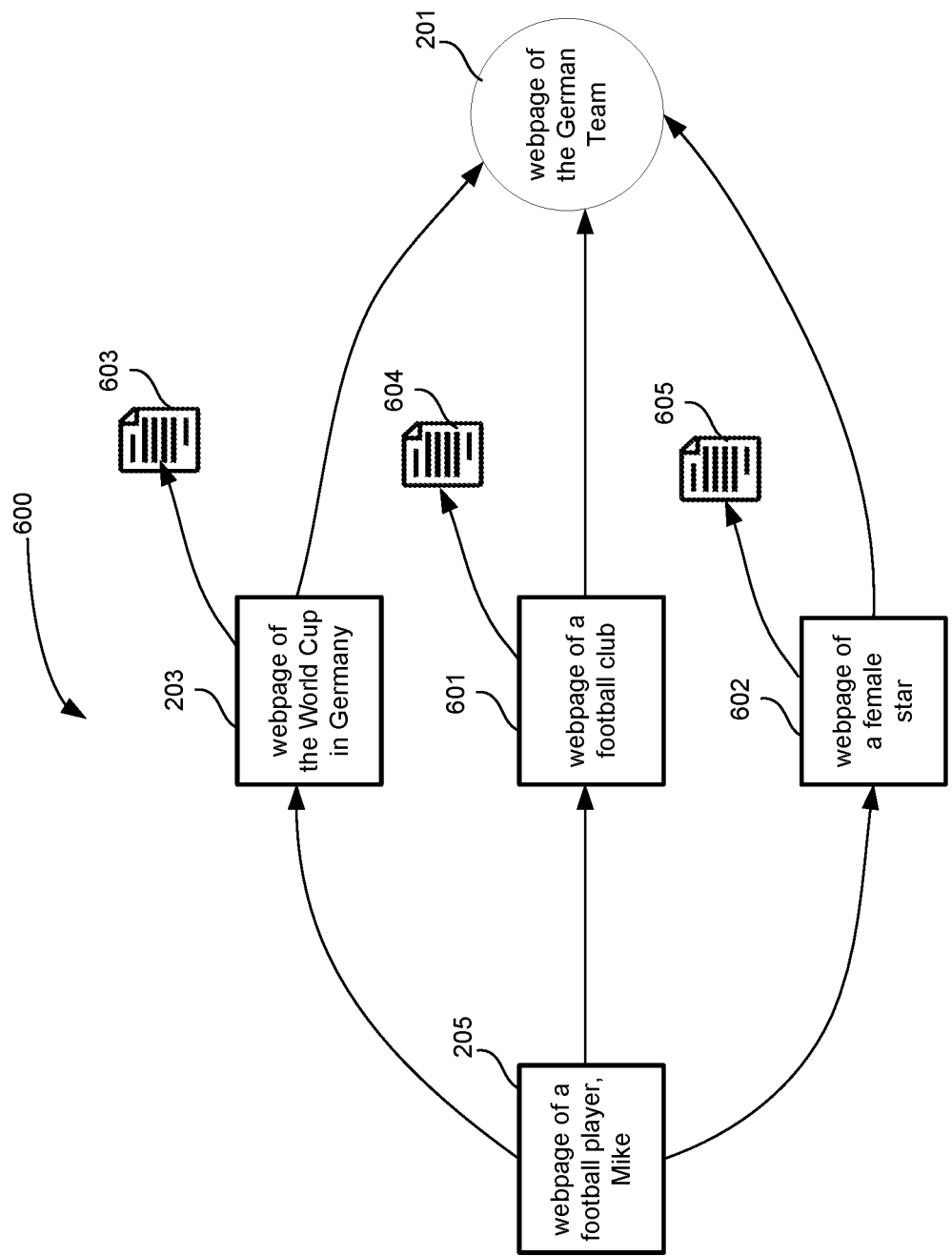
FIG. 6 is an exemplary block diagram of a structure of a backward topological relationship graph according to embodiments of the present disclosure.

Description may be made on a processing procedure based on the backward topological relationship graph below with a specific example, as shown in FIG. 6, which is an exemplary block diagram 600 of a structure of a backward topological relationship graph according to embodiments of the present disclosure and FIG. 7, which is an exemplary block diagram 700 of a structure of a backward topological relationship graph according to embodiments of the present disclosure. The SPO in the forward topological relationship graph may be still used as an example in the process of establishing the backward topological relationship graph.

As mentioned in the preceding example, after the stage A and stage B in the preceding example, the found candidate entity webpages may be: the webpage 205 of the football player, Mike, and the webpage 206 of the ski player, Mike.

Stage C1: Establishing Backward Topological Relationship Graph

Webpages are captured with the webpage 205 of the football player, Mike as start. After webpages are captured for two turns, a topological structure is generated, as shown in FIG. 6. More particularly, the webpage 205 of the football player, Mike, may be a second head node, the webpage 201 of the German Team may be the second sink node, the webpage 203 of the World Cup in Germany, a webpage 601 of a football club, a webpage 602 of a female star, a webpage 603, a webpage 604, and a webpage 605 may be the second intermediate nodes.

Webpages are captured with the webpage 206 of the ski player, Mike, as a start. After webpages are captured for two turns, a topological structure is generated, as shown in FIG. 7. More particularly, the webpage 206 of the ski player, Mike, may be a second head node, the webpage 201 of the German Team may be the second sink node, the webpage 203 of the World Cup in Germany, a webpage 701 of a ski resort, a webpage 702 of a sports brand, a webpage 706 of the Winter Olympics, a webpage 707 of a basketball player, a webpage 703, a webpage 704, and a webpage 705 are second intermediate nodes.

A specific capturing process is similar to the processing procedure of establishing the forward topological relationship graph, and description thereon may be omitted so as to avoid redundancy.

Stage D1: Random Walking

Figure 8:
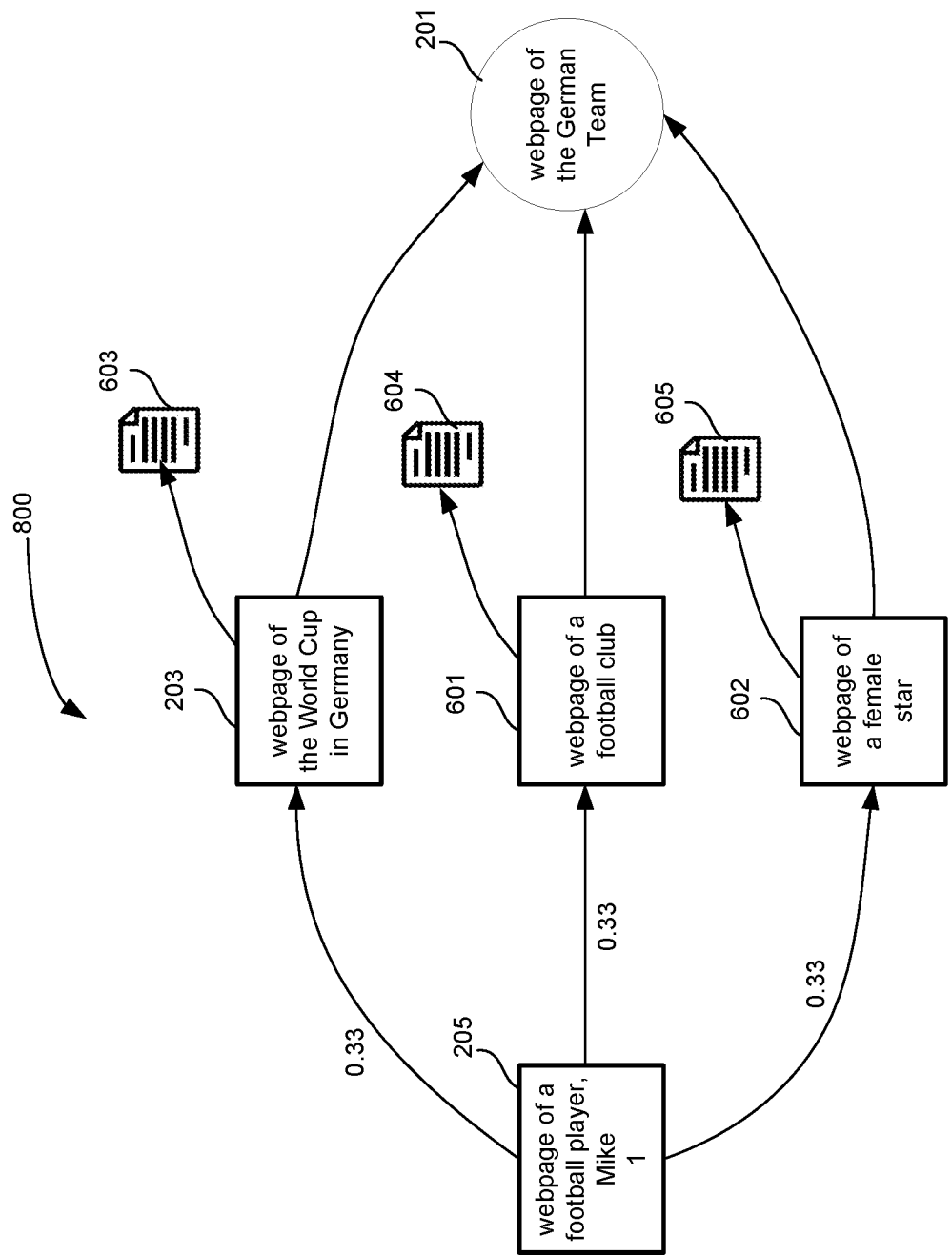
FIG. 8 is an exemplary block diagram of a random walking of the first turn based on the backward topological relationship graph shown in FIG. 6 according to embodiments of the present disclosure.
Figure 9:
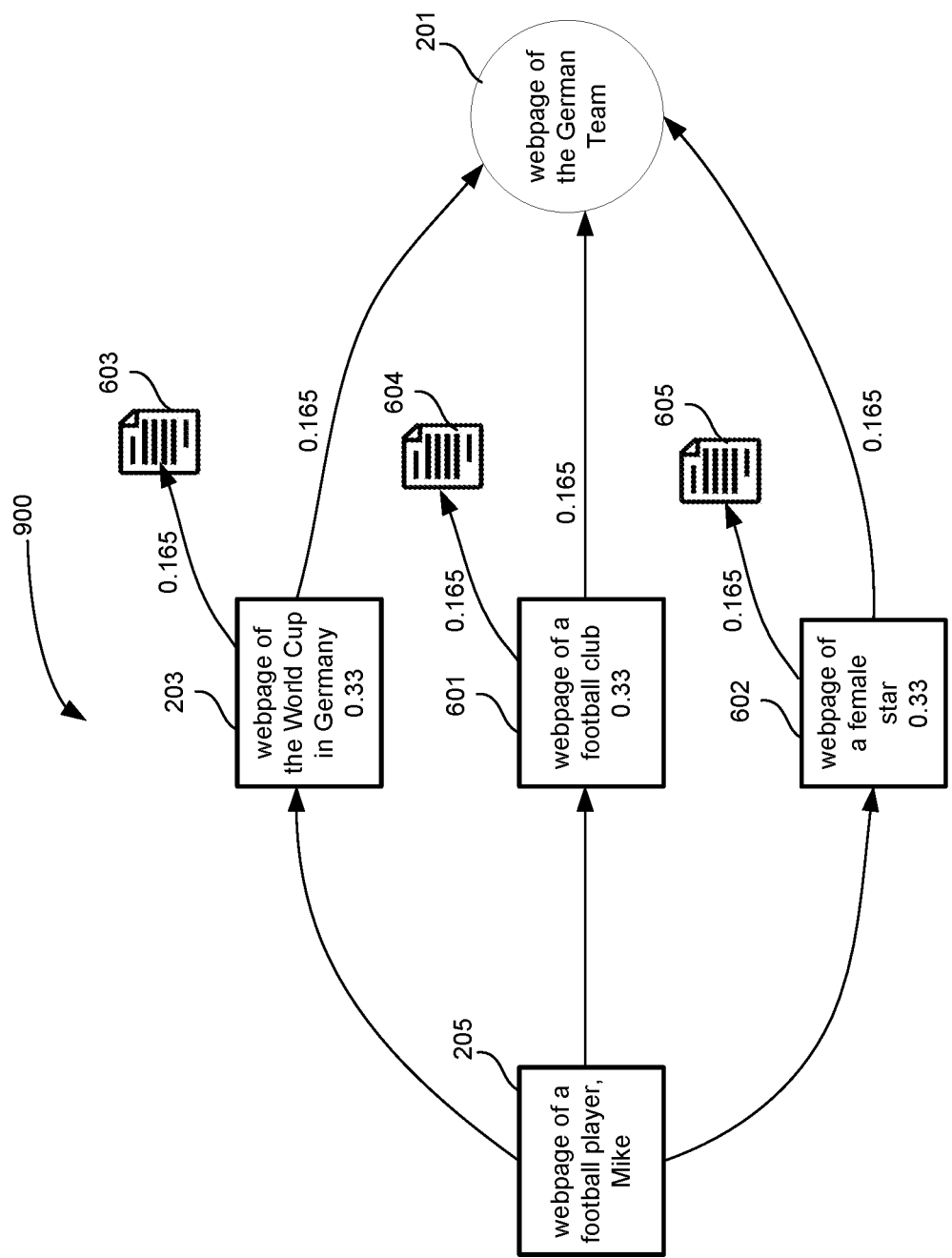
FIG. 9 is an exemplary block diagram of a random walking of the second turn based on the backward topological relationship graph shown in FIG. 6 according to embodiments of the present disclosure.

As shown in FIG. 8, which is an exemplary block diagram 800 of a random walking of a first turn based on the backward topological relationship graph shown in FIG. 6 according to embodiments of the present disclosure, and FIG. 9, which is an exemplary block diagram 900 of random walking of a second turn based on the backward topological relationship graph shown in FIG. 6 according to embodiments of the present disclosure, description would be made on the random walking.

In the random walking of the first turn based on FIG. 6 (as shown in FIG. 8): starting from the webpage 205 of the football player Mike as a second head node, an initial weight value of 1 is assigned to the webpage 205 of the football player, Mike, and weight values are equally assigned to webpages to which the webpage 205 of the football player, Mike, is pointed according to its outdegree. As shown in FIG. 8, the outdegree of the webpage 205 of the football player, Mike, is 3, and a weight value of 0.33 is assigned in each outdegree thereof. Therefore, the webpage 203 of the World Cup in Germany, the webpage 601 of a football club, and the webpage 602 of a female star are respectively assigned with a weight value of 0.33.

In the random walking of the second turn based on FIG. 6 (as shown in FIG. 9): assigning of weight values may be further performed with the weight values obtained for the webpages when the random walking of the first turn is finished as the initial weight values of the random walking of the second turn. As shown in FIG. 9, the outdegrees of the webpage 203 of the World Cup in Germany, the webpage 601 of a football club, and the webpage 602 of a female star are 2 respectively, and the weight values assigned to the webpages to which the three webpages are pointed are 0.165 respectively.

After the random walking of the second turn, the weight value accumulatively obtained by the webpage 201 of the German Team in FIG. 6 is 0.495. The calculation on weight values based on the backward topological relationship graph is to perform selection on candidate entity webpages, and thus the weight value of 0.495 may be used as the weight value of the webpage 205 of the football player Mike.

Figure 10:
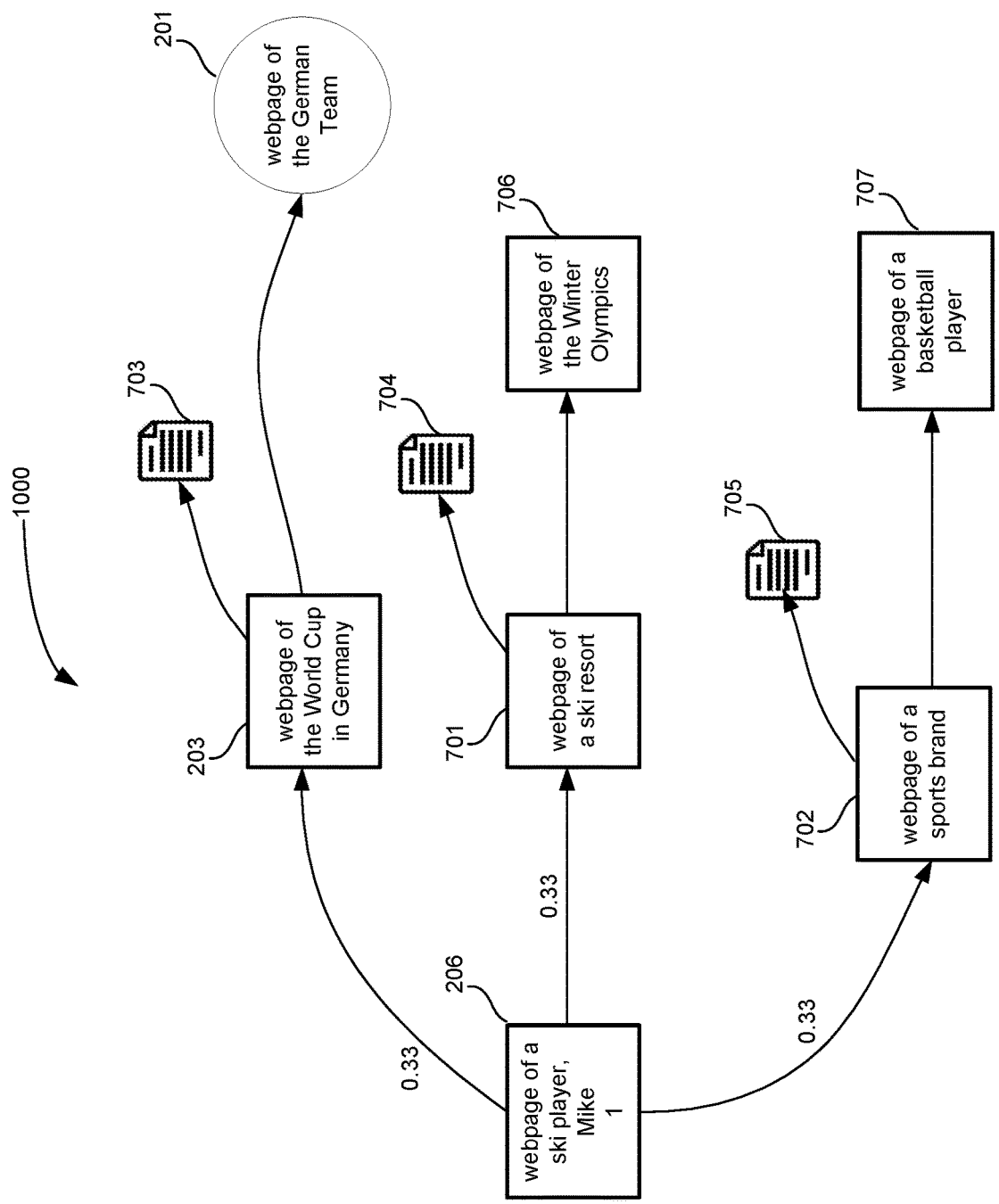
FIG. 10 is an exemplary block diagram of a random walking of a first turn based on the backward topological relationship graph shown in FIG. 7 according to embodiments of the present disclosure.

As shown in FIG. 10, which is an exemplary block diagram 1000 of random walking of a first turn based on the backward topological relationship graph shown in FIG. 7 according to embodiments of the present disclosure and FIG. 11, which is an exemplary block diagram 1100 of a random walking of a second turn based on the backward topological relationship graph shown in FIG. 7 according to embodiments of the present disclosure, description would be made as follows.

Figure 7:
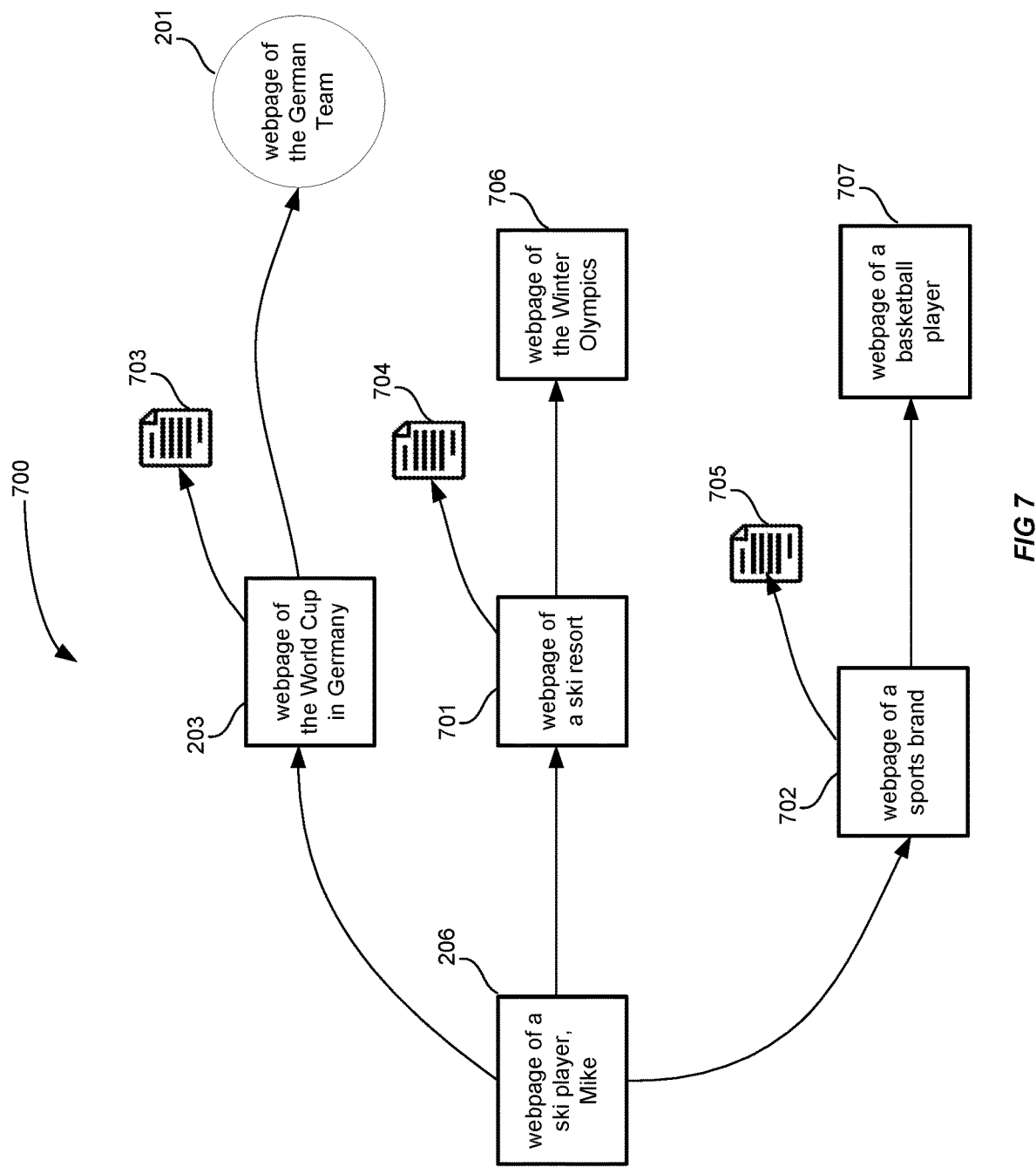
FIG. 7 is an exemplary block diagram of a structure of a backward topological relationship graph according to embodiments of the present disclosure.

In the random walking of the first turn based on FIG. 7 (as shown in FIG. 10): starting from the webpage 206 of the ski player, Mike, as a second head node, an initial weight value of 1 is assigned to the webpage 206 of the ski player, Mike, and weight values are equally assigned to webpages to which the webpage 206 of the ski player, Mike, is pointed according to its outdegree. As shown in FIG. 10, the outdegree of the webpage 206 of the ski player, Mike, is 3, and a weight value of 0.33 is assigned in each outdegree thereof. Therefore, the webpage 203 of the World Cup in Germany, the webpage 701 of a ski resort, and the webpage 702 of a sports brand are respectively assigned with a weight value of 0.33.

Figure 11:
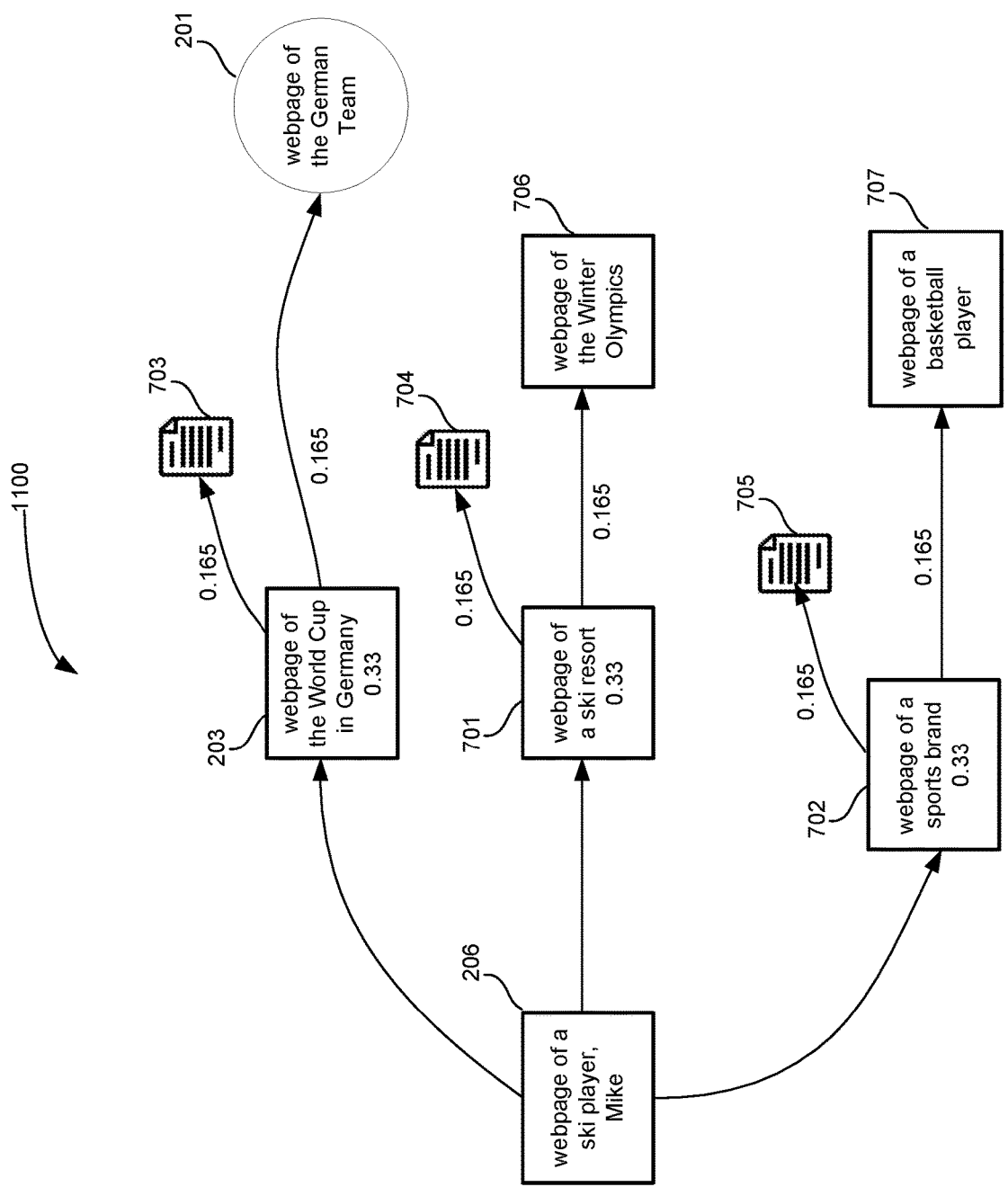
FIG. 11 is an exemplary block diagram of a random walking of a second turn based on the backward topological relationship graph shown in FIG. 7 according to embodiments of the present disclosure.

In the random walking of the second turn based on FIG. 7 (as shown in FIG. 11): assigning of weight values may be further performed with the weight values obtained for the webpages when the random walking of the first turn is finished as the initial weight values of the random walking of the second turn. As shown in FIG. 11, the outdegrees of the webpage 203 of the World Cup in Germany, the webpage 701 of a ski resort, and the webpage 702 of a sports brand are 2 respectively, and the weight values assigned to the webpages to which the three webpages are pointed are 0.165 respectively.

After the random walking of the second turn, the weight value accumulatively obtained by the webpage 201 of the German Team in FIG. 7 is 0.165. The calculation on weight values based on the backward topological relationship graph is to perform selection on candidate entity webpages, and thus the weight value of 0.165 is used as the weight value of the webpage 206 of the ski player, Mike.

Stage E1: Weight Value Ranking Obtained Based on Backward Topological Relationship Graph As can be seen by comparison, the weight value of the webpage 206 of the ski player, Mike, is smaller than the weight value of the webpage 205 of the football player, Mike. Therefore, the webpage link of the webpage 205 of the football player, Mike, is selected as the value link of the object in the SPO.

Application of Combination of Forward Topological Relationship Graph and Backward Topological Relationship Graph The forward topological relationship graph and the backward topological relationship graph exploit the association relationship between the subject entity webpage and the candidate entity webpages in two directions. In the implementation, the weight values of the candidate entity webpages may be calculated by combining the forward topological relationship graph with the backward topological relationship graph.

More particularly, the forward topological relationship graph and the backward topological relationship graph are established respectively according to the method for establishing the forward topological relationship graph and the method for establishing the backward topological relationship graph described above. The weight values of the candidate entity webpages in the forward topological relationship graph obtained by random walking based on the forward topological relationship graph described above are used as the first intermediate weight values, and the weight values of the candidate entity webpages in the backward topological relationship graph obtained by random walking based on the backward topological relationship graph described above are used as the second intermediate weight values. The first intermediate weight value and the second intermediate weight value of each the candidate entity webpage are added together to obtain a final weight value of the each candidate entity webpage. Finally, the candidate entity webpages are ranked according to the final weight values thereof, so that the webpage links of the candidate entity webpages on the top may be selected as the value links of the object in the SPO.

The weight values of the candidate entity webpages obtained by combining the forward topological relationship graph with the backward topological relationship graph may reflect the association relationship between the subject entity webpage and the candidate entity webpages more comprehensively, so that more accurate value links may be obtained.

Example of Application of Combination of Forward Topological Relationship Graph and Backward Topological Relationship Graph Still with the SPO information described in FIG. 2 to FIG. 11 as an example, as described above, the weight values of the candidate entity webpages are obtained respectively by calculation based on the forward topological relationship graph shown in FIG. 2 and the backward topological relationship graph shown in FIG. 6 and FIG. 7 (with random walking performed for two turns as an example), and then added together to obtain the final weight value of each of the candidate entity webpages.

More particularly, the weight values obtained by the webpage 205 of the football player, Mike, and the webpage 206 of the ski player, Mike, are 0.166 and 0.125 respectively (based on the random walking performed for two turns) as shown in FIG. 2.

The weight value obtained by the webpage 205 of the football player Mike is 0.495 as shown in FIG. 6, and the weight value obtained by the webpage 206 of the ski player, Mike, is 0.165 as shown in FIG. 7.

The weight values obtained based on the forward topological relationship graph and the weight values obtained based on the backward topological relationship graph are added respectively. The weight value finally obtained by the webpage 205 of the football player, Mike, is 0.661, and the weight value finally obtained by the webpage 206 of the ski player, Mike, is 0.29.

As can be seed from ranking processing, the weight value of the webpage 205 of the football player, Mike, is far larger than the weight value of the webpage 206 of the ski player, Mike. Therefore, the webpage link of the webpage 205 of the football player, Mike, is selected as the value link of the object in the SPO.

Illustrative Implementation

Figure 12:
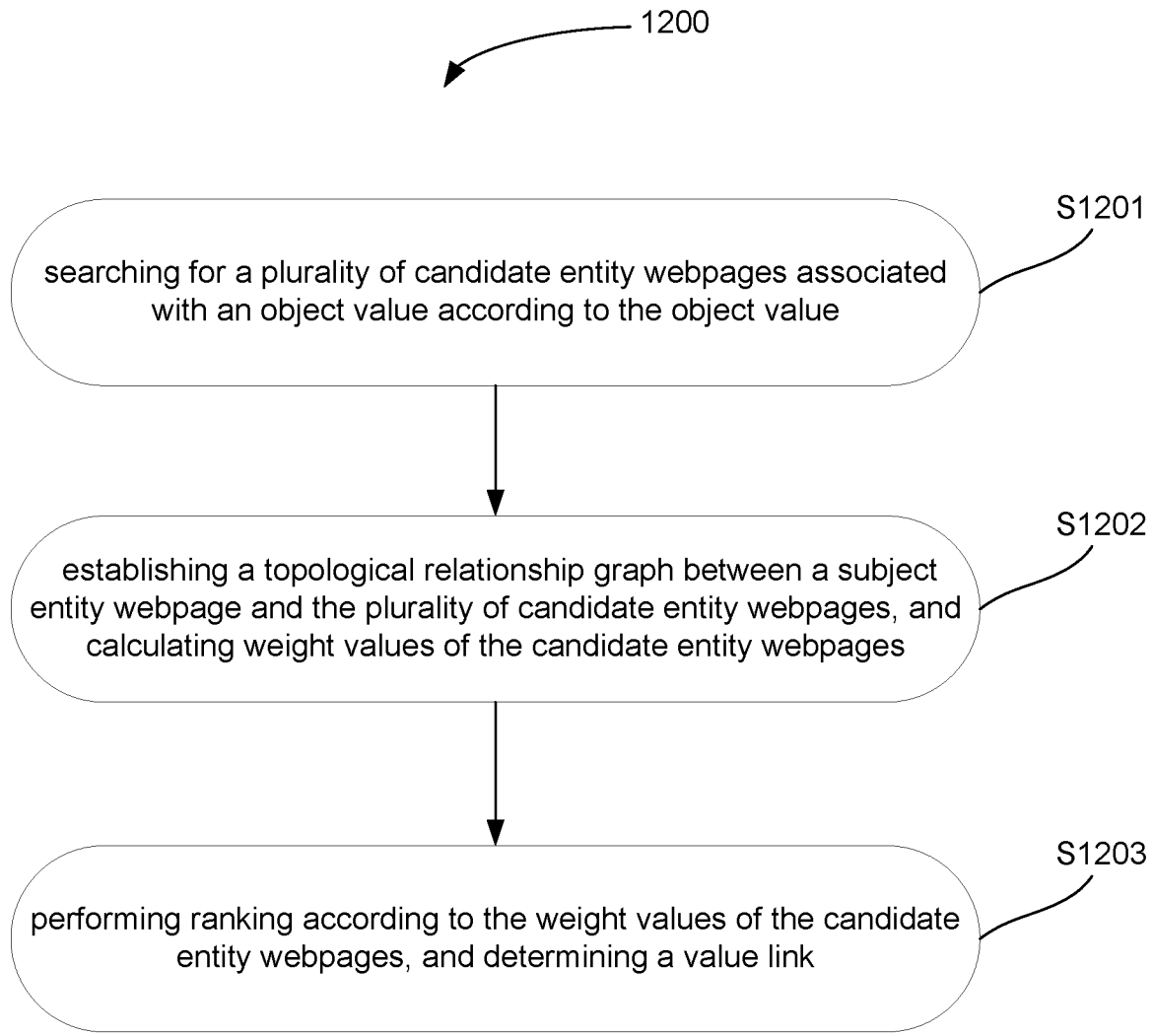
FIG. 12 is a schematic flowchart showing a method for acquiring an entity webpage link according to embodiments of the present disclosure.

As shown in FIG. 12, which is a schematic flowchart 1200 showing a method for acquiring an entity webpage link according to embodiments of the present disclosure, the method includes:

S1201: searching for a plurality of candidate entity webpages associated with an object value according to the object value;

S1202: establishing a topological relationship graph between a subject entity webpage and the plurality of candidate entity webpages, and calculating weight values of the candidate entity webpages according to a relationship of a path between the candidate entity webpages and the subject entity webpage in the topological relationship graph.

More particularly, the establishing a topological relationship graph between a subject entity webpage and the plurality of candidate entity webpages includes: establishing a forward topological relationship graph from the subject entity webpage to the plurality of candidate entity webpages, and/or establishing a plurality of backward topological relationship graphs from the candidate entity webpages to the subject entity webpage.

The calculating weight values of the candidate entity webpages according to a relationship of a path between the candidate entity webpages and the subject entity webpage in the topological relationship graph may include: calculating the weight values of the candidate entity webpages by random walking. The weight value may be obtained based on the forward topological relationship graph, or obtained based on the backward topological relationship graph, or obtained based on a combination of the forward topological relationship graph and the backward topological relationship graph.

S1203: performing ranking according to the weight values of the candidate entity webpages, and determining a value link corresponding to the object value according to the ranking result.

Implementation Example of Electronic Apparatus

The electronic apparatus according to embodiments of the present disclosure may be a mobile electronic apparatus, or an electronic apparatus with less mobility or a stationary computing apparatus. The electronic apparatus according to embodiments of the present disclosure may at least include a processor and a memory. The memory may store instructions thereon and the processor may obtain instructions from the memory and execute the instructions to cause the electronic apparatus to perform operations.

In some examples, one or more components or modules and one or more steps as shown in FIG. 1 to FIG. 12 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 13:
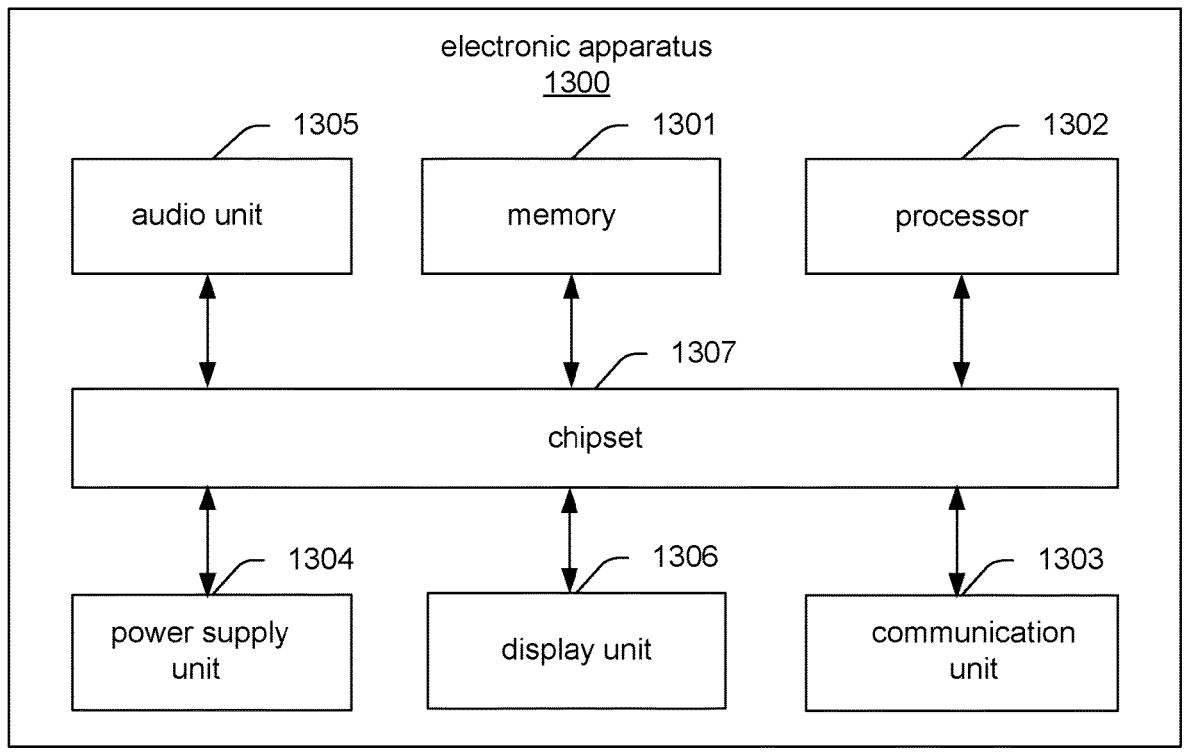
FIG. 13 is a structural block diagram of an exemplary mobile electronic apparatus.

As shown in FIG. 13, which is a structural block diagram of an exemplary mobile electronic apparatus 1300. The electronic apparatus 133 may be a small portable (or mobile) electronic apparatus. The small portable (or mobile) electronic apparatus may be e.g., a cell phone, a personal digital assistant (PDA), a personal media player device, a wireless network player device, personal headset device, an IoT (internet of things) intelligent device, a dedicate device or combined device containing any of functions described above. The electronic apparatus 1300 may at least include a memory 1301 and a processor 1302.

The memory 1301 may be configured to store programs. In addition to the above programs, the memory 1301 may be configured to store other data to support operations on the electronic apparatus 1300. The examples of these data may include instructions of any applications or methods operated on the electronic apparatus 1300, contact data, phone book data, messages, pictures, videos, and the like.

The memory 1301 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

The memory 1301 may be coupled to the processor 1302 and contain instructions stored thereon. The instructions may cause the electronic apparatus 1300 to perform operations upon being executed by the processor 1302, the operations may include: implement the processing operations of the method of acquiring an entity webpage link shown in FIG. 1 to FIG. 12, or processing operations of the processing logics of the device of acquiring an entity webpage link shown in FIG. 1 to FIG. 11.

Detailed description has been made on the above operations in the above embodiments of method and device. The description on the above operations may be applied to electronic apparatus 1300. That is to say, the specific operations mentioned in the above embodiments may be recorded in memory 1301 in program and be performed by processor 1302.

Furthermore, as shown in FIG. 13, the electronic apparatus 1300 may further include: a communication unit 1303, a power supply unit 1304, an audio unit 1305, a display unit 1306, chipset 1307, and other units. Only part of units are exemplarily shown in FIG. 13 and it is obvious to one skilled in the art that the electronic apparatus 1300 only includes the units shown in FIG. 13.

The communication unit 1303 may be configured to facilitate wireless or wired communication between the electronic apparatus 1300 and other apparatuses. The electronic apparatus may be connected to wireless network based on communication standard, such as WiFi, 2G, 3G, or their combination. In an exemplary example, the communication unit 1303 may receive radio signal or radio related information from external radio management system via radio channel. In an exemplary example, the communication unit 1303 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1304 may be configured to supply power to various units of the electronic device. The power supply unit 1304 may include a power supply management system, one or more power supplies, and other units related to power generation, management, and allocation.

The audio unit 1305 may be configured to output and/or input audio signals. For example, the audio unit 1305 may include a microphone (MIC). When the electronic apparatus in an operation mode, such as calling mode, recording mode, and voice recognition mode, the MIC may be configured to receive external audio signals. The received audio signals may be further stored in the memory 1301 or sent via the communication unit 1303. In some examples, the audio unit 1305 may further include a speaker configured to output audio signals.

The display unit 1306 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1301, processor 1302, communication unit 1303, power supply unit 1304, audio unit 1305 and display unit 1306 may be connected with the chipset 1307. The chipset 1307 may provide interface between the processor 1302 and other units of the electronic apparatus 1300. Furthermore, the chipset 1307 may provide interface for each unit of the electronic apparatus 1300 to access the memory 1301 and communication interface for accessing among units.

In some examples, one or more modules, one or more steps, or one or more processing procedures involved in FIGS. 1 to 12 may be implemented by a computing device with an operating system and hardware configuration.

Figure 14:
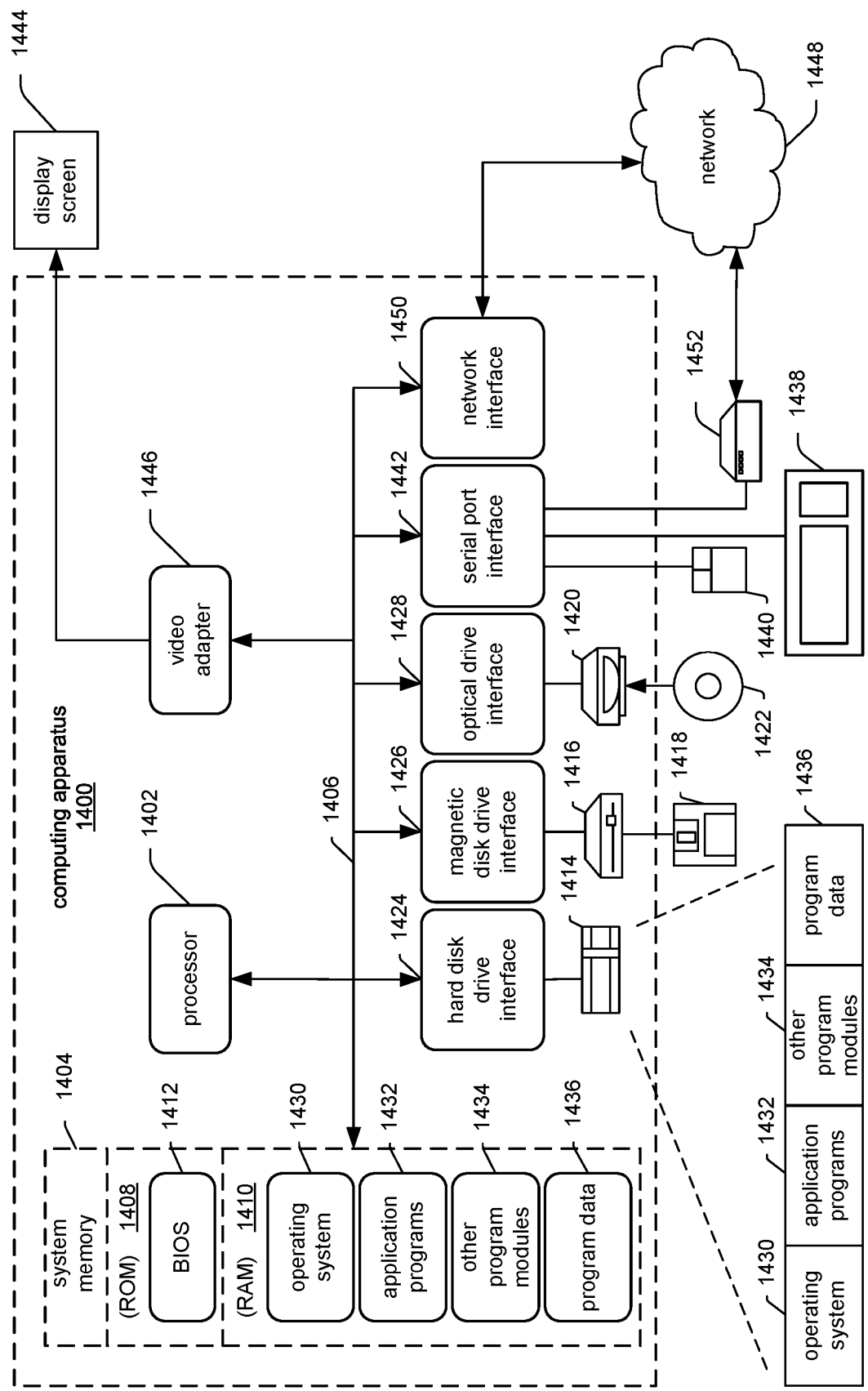
FIG. 14 is a structural block diagram of an exemplary computing apparatus.

FIG. 14 is a structural block diagram of an exemplary computing apparatus 1400. The description of computing apparatus 1400 provided herein is provided for purposes of illustration, and is not intended to be limiting. Embodiments may be implemented in further types of computer systems, as would be known to persons skilled in the relevant art(s).

As shown in FIG. 14, the computing apparatus 1400 includes one or more processors 1402, a system memory 1404, and a bus 1406 that couples various system components including system memory 1404 to processor 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408, and random access memory (RAM) 1410. A basic input/output system 1412 (BIOS) is stored in ROM 1408.

The computing apparatus 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMs, ROMs, and the like.

A number of program modules may be stored on the hard disk, magnetic disk, optical disk, ROM, or RAM. These programs include an operating system 1430, one or more application programs 1432, other program modules 1434, and program data 1436. These programs may include, for example, computer program logic (e.g., computer program code or instructions) for implementing processing procedures, processing logics, and program modules performed in the examples shown in FIG. 1 to FIG. 12.

A user may enter commands and information into computing apparatus 1400 through input devices such as a keyboard 1438 and a pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices may be connected to processor 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing apparatus 1400. Display screen 1444 may display information, as well as being a user interface for receiving user commands and/or other information (e.g., by touch, finger gestures, virtual keyboard, etc.). In addition to display screen 1444, the computing apparatus 1400 may include other peripheral output devices (not shown) such as speakers and printers.

The computing apparatus 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to generally refer to media such as the hard disk associated with hard disk drive 1414, removable magnetic disk 1418, removable optical disk 1422, system memory 1404, flash memory cards, digital video disks, RAMs, ROMs, and further types of physical/tangible storage media. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable computing apparatus 1400 to implement features of embodiments discussed herein. Accordingly, such computer programs represent controllers of the computing apparatus 1400.

As such, embodiments are also directed to computer program products including computer instructions/code stored on any computer useable storage medium. Such code/instructions, when executed in one or more data processing devices, causes a data processing device(s) to operate as described herein. Examples of computer-readable storage devices that may include computer readable storage media include storage devices such as RAM, hard drives, floppy disk drives, CD ROM drives, DVD ROM drives, zip disk drives, tape drives, magnetic storage device drives, optical storage device drives, MEMs devices, nanotechnology-based storage devices, and further types of physical/tangible computer readable storage devices.

Example Clauses

A. A device, comprising:

a candidate entity webpage acquiring module configured to search for a plurality of candidate entity webpages associated with the object value according to an object value;

a topological relationship graph establishing module configured to establish a topological relationship graph between a subject entity webpage and the plurality of candidate entity webpages;

a weight value calculating module configured to calculate weight values of the candidate entity webpages according to a relationship of a path between the candidate entity webpages and the subject entity webpage in the topological relationship graph; and a ranking module configured to perform ranking on the weight values of the candidate entity webpages according to the weight values of the candidate entity webpages, and determine a value link corresponding to the object value according to the ranking result.

B. The device according to paragraph A, wherein the topological relationship graph comprises a forward topological relationship graph, and the forward topological relationship graph comprises a first head node, a first intermediate node, and a first sink node, the establishing a topological relationship graph between a subject entity webpage and the plurality of candidate entity webpages comprises:

using the subject entity webpage as the first head node;

capturing a plurality of intermediate entity webpages and/or the candidate entity webpages to which the subject entity webpage is pointed with the subject entity webpage as a start, and then capturing one or more new intermediate entity webpages and/or the candidate entity webpages from the captured intermediate entity webpages; and repeating the processing of the using the subject entity webpage as the first head node and the capturing a plurality of intermediate entity webpages and/or the candidate entity webpages to which the subject entity webpage is pointed with the subject entity webpage as a start, and then capturing one or more new intermediate entity webpages and/or the candidate entity webpages from the captured intermediate entity webpages, until a preset first capturing turn number is arrived and/or a preset first number of paths from the subject entity webpage to the candidate entity webpages are formed, wherein the intermediate entity webpages are used as the first intermediate nodes, and the candidate entity webpages are used as the first sink nodes.

C. The device according to paragraph B, wherein the calculating weight values of the candidate entity webpages according to a relationship of a path between the candidate entity webpages and the subject entity webpage in the topological relationship graph comprises:

assigning an initial first weight value to the first head node, performing weight value assignment by random walking according to outdegrees of the nodes, until a preset first random walking turn number is arrived and/or the sink nodes are assigned with weight values, and acquiring weight values of the first sink nodes when the random walking is finished as the weight values of the candidate entity webpages.

D. The device according to paragraph B, wherein the topological relationship graph further comprises a plurality of backward topological relationship graphs, and the backward topological relationship graph comprises a second head node, a second intermediate node and a second sink node, the establishing a topological relationship graph between a subject entity webpage and the plurality of candidate entity webpages further comprises: establishing the plurality of backward topological relationship graphs from the candidate entity webpages to the subject entity webpage respectively as follows:

using the candidate entity webpages as the second head nodes;

capturing a plurality of intermediate entity webpages or the subject entity webpage to which the candidate entity webpages are pointed with the second head nodes as start, and then capturing one or more new intermediate entity webpages and/or the subject entity webpage from the captured intermediate entity webpages; and repeating the processing of the using the candidate entity webpages as the second head nodes and the capturing a plurality of intermediate entity webpages or the subject entity webpage to which the candidate entity webpages are pointed with the second head nodes as start, and capturing one or more new intermediate entity webpages and/or the subject entity webpage from the captured intermediate entity webpages, until a preset second capturing turn number is arrived and/or a preset second number of paths from the candidate entity webpages to the subject entity webpages are formed, wherein the intermediate entity webpages are used as the second intermediate nodes, and the subject entity webpage is used as the second sink node.

E. The device according to paragraph D, wherein the calculating weight values of the candidate entity webpages according to a relationship of a path between the candidate entity webpages and the subject entity webpage in the topological relationship graph comprises:

assigning an initial first weight value to the first head node based on the forward topological relationship graph, performing weight value assignment by random walking according to the outdegrees of the nodes, until the preset first random walking turn number is arrived and/or the sink nodes are assigned with weight values, and using the weight values of the first sink nodes when the random walking based on the forward topological relationship graph is finished as the first intermediate weight values corresponding to the candidate entity webpages;

assigning initial second weight values to the second head nodes based on the backward topological relationship graphs, performing weight value assignment by random walking according to the outdegrees of the nodes, until a preset second random walking turn number is arrived and/or the second sink node is assigned with weight values, and using the weight values of the second sink nodes in the backward topological relationship graphs when the random walking based on the backward topological relationship graphs is finished as the second intermediate weight values of the candidate entity webpages in the backward topological relationship graphs; and using a weight value obtained by adding the first intermediate weight value and the second intermediate weight value of each candidate entity webpage as the weight value of the each candidate entity webpage.

F. The device according to paragraph D, wherein the searching for a plurality of candidate entity webpages associated with the object value according to an object value comprises:

performing matching searching on the object value and an anchor text in the webpage to acquire the plurality of candidate entity webpages associated with the object value.

G. A method, including:

searching for a plurality of candidate entity webpages associated with an object value according to the object value;

establishing a topological relationship graph between a subject entity webpage and the plurality of candidate entity webpages, and calculating weight values of the candidate entity webpages according to a relationship of a path between the candidate entity webpages and the subject entity webpage in the topological relationship graph; and performing ranking according to the weight values of the candidate entity webpages, and determining a value link corresponding to the object value according to the ranking result.

H. The method according to paragraph G, wherein the establishing a topological relationship graph between a subject entity webpage and the plurality of candidate entity webpages comprises:

establishing a forward topological relationship graph from the subject entity webpage to the plurality of candidate entity webpages, and/or establishing a plurality of backward topological relationship graphs from the candidate entity webpages to the subject entity webpage.

I. The method according to paragraph H, wherein the calculating weight values of the candidate entity webpages according to a relationship of a path between the candidate entity webpages and the subject entity webpage in the topological relationship graph includes: calculating the weight values of the candidate entity webpages by random walking.

J. The method according to paragraph G, wherein the topological relationship graph comprises a forward topological relationship graph, and the forward topological relationship graph comprises a first head node, a first intermediate node, and a first sink node, the establishing a topological relationship graph between a subject entity webpage and the plurality of candidate entity webpages includes:

using the subject entity webpage as the first head node;

capturing a plurality of intermediate entity webpages and/or the candidate entity webpages to which the subject entity webpage is pointed with the subject entity webpage as a start, and then capturing one or more new intermediate entity webpages and/or the candidate entity webpages from the captured intermediate entity webpages; and repeating the processing of the using the subject entity webpage as the first head node and the capturing a plurality of intermediate entity webpages and/or the candidate entity webpages to which the subject entity webpage is pointed with the subject entity webpage as a start, and then capturing one or more new intermediate entity webpages and/or the candidate entity webpages from the captured intermediate entity webpages, until a preset first capturing turn number is arrived and/or a preset first number of paths from the subject entity webpage to the candidate entity webpages are formed, wherein the intermediate entity webpages are used as the first intermediate nodes, and the candidate entity webpages are used as the first sink nodes.

K. The method according to paragraph J, wherein the calculating weight values of the candidate entity webpages according to a relationship of a path between the candidate entity webpages and the subject entity webpage in the topological relationship graph includes:

assigning an initial first weight value to the first head node, performing weight value assignment by random walking according to outdegrees of the nodes, until a preset first random walking turn number is arrived and/or the sink nodes are assigned with weight values, and acquiring weight values of the first sink nodes when the random walking is finished as the weight values of the candidate entity webpages.

L. The method according to paragraph J, wherein the topological relationship graph further includes a plurality of backward topological relationship graphs, and the backward topological relationship graph comprises a second head node, a second intermediate node and a second sink node, the establishing a topological relationship graph between a subject entity webpage and the plurality of candidate entity webpages further comprises: establishing the plurality of backward topological relationship graphs from the candidate entity webpages to the subject entity webpage respectively as follows:

using the candidate entity webpages as the second head nodes;

capturing a plurality of intermediate entity webpages or the subject entity webpage to which the candidate entity webpages are pointed with the second head nodes as start, and then capturing one or more new intermediate entity webpages and/or the subject entity webpage from the captured intermediate entity webpages; and repeating the processing of the using the candidate entity webpages as the second head nodes and the capturing a plurality of intermediate entity webpages or the subject entity webpage to which the candidate entity webpages are pointed with the second head nodes as start, and capturing one or more new intermediate entity webpages and/or the subject entity webpage from the captured intermediate entity webpages, until a preset second capturing turn number is arrived and/or a preset second number of paths from the candidate entity webpages to the subject entity webpages are formed, wherein the intermediate entity webpages are used as the second intermediate nodes, and the subject entity webpage is used as the second sink node.

M. The method according to paragraph L, wherein the calculating weight values of the candidate entity webpages according to a relationship of a path between the candidate entity webpages and the subject entity webpage in the topological relationship graph includes:

assigning an initial first weight value to the first head node based on the forward topological relationship graph, performing weight value assignment by random walking according to the outdegrees of the nodes, until the preset first random walking turn number is arrived and/or the sink nodes are assigned with weight values, and using the weight values of the first sink nodes when the random walking based on the forward topological relationship graph is finished as the first intermediate weight values corresponding to the candidate entity webpages;

assigning initial second weight values to the second head nodes based on the backward topological relationship graphs, performing weight value assignment by random walking according to the outdegrees of the nodes, until a preset second random walking turn number is arrived and/or the second sink node is assigned with weight values, and using the weight values of the second sink nodes in the backward topological relationship graphs when the random walking based on the backward topological relationship graphs is finished as the second intermediate weight values of the candidate entity webpages in the backward topological relationship graphs; and using a weight value obtained by adding the first intermediate weight value and the second intermediate weight value of each candidate entity webpage as the weight value of the each candidate entity webpage.

N. The method according to paragraph G, wherein the searching for a plurality of candidate entity webpages associated with the object value according to an object value includes:

performing matching searching on the object value and an anchor text in the webpage to acquire the plurality of candidate entity webpages associated with the object value.

O. The method according to paragraph J, wherein removing a node link pointing to the first head node, and adding a returning edge pointing to the first sink node on the first sink node during establishing the forward topological relationship graph.

P. The method according to paragraph L, wherein removing a node link pointing to the first head node, and adding a returning edge pointing to the first sink node on the first sink node during establishing the forward topological relationship graph; and removing a node link pointing to the second head node, and adding a returning edge pointing to the second sink node on the second sink node during establishing the backward topological relationship graph.

Q. An electronic apparatus, including:

a processing unit; and a memory, coupled to the processing unit and containing instructions stored thereon, the instructions cause the electronic apparatus to perform operations upon being executed by the processing unit, the operations include:

searching for a plurality of candidate entity webpages associated with an object value according to the object value;

establishing a topological relationship graph between a subject entity webpage and the plurality of candidate entity webpages, and calculating weight values of the candidate entity webpages according to a relationship of a path between the candidate entity webpages and the subject entity webpage in the topological relationship graph; and performing ranking according to the weight values of the candidate entity webpages, and determining a value link corresponding to the object value according to the ranking result.

R. The electronic apparatus according to paragraph Q, wherein the establishing a topological relationship graph between a subject entity webpage and the plurality of candidate entity webpages includes:

establishing a forward topological relationship graph from the subject entity webpage to the plurality of candidate entity webpages, and/or establishing a plurality of backward topological relationship graphs from the candidate entity webpages to the subject entity webpage.

S. The electronic apparatus according to paragraph Q, wherein the topological relationship graph comprises a forward topological relationship graph, and the forward topological relationship graph comprises a first head node, a first intermediate node, and a first sink node, the establishing a topological relationship graph between a subject entity webpage and the plurality of candidate entity webpages includes:

using the subject entity webpage as the first head node;

capturing a plurality of intermediate entity webpages and/or the candidate entity webpages to which the subject entity webpage is pointed with the subject entity webpage as a start, and then capturing one or more new intermediate entity webpages and/or the candidate entity webpages from the captured intermediate entity webpages; and repeating the processing of the using the subject entity webpage as the first head node and the capturing a plurality of intermediate entity webpages and/or the candidate entity webpages to which the subject entity webpage is pointed with the subject entity webpage as a start, and then capturing one or more new intermediate entity webpages and/or the candidate entity webpages from the captured intermediate entity webpages, until a preset first capturing turn number is arrived and/or a preset first number of paths from the subject entity webpage to the candidate entity webpages are formed, wherein the intermediate entity webpages are used as the first intermediate nodes, and the candidate entity webpages are used as the first sink nodes.

T. The electronic apparatus according to paragraph S, wherein the calculating weight values of the candidate entity webpages according to a relationship of a path between the candidate entity webpages and the subject entity webpage in the topological relationship graph comprises:

assigning an initial first weight value to the first head node, performing weight value assignment by random walking according to outdegrees of the nodes, until a preset first random walking turn number is arrived and/or the sink nodes are assigned with weight values, and acquiring weight values of the first sink nodes when the random walking is finished as the weight values of the candidate entity webpages.

U. The electronic apparatus according to paragraph S, wherein the topological relationship graph further includes a plurality of backward topological relationship graphs, and the backward topological relationship graph includes a second head node, a second intermediate node and a second sink node, the establishing a topological relationship graph between a subject entity webpage and the plurality of candidate entity webpages further includes: establishing the plurality of backward topological relationship graphs from the candidate entity webpages to the subject entity webpage respectively as follows:

using the candidate entity webpages as the second head nodes;

capturing a plurality of intermediate entity webpages or the subject entity webpage to which the candidate entity webpages are pointed with the second head nodes as start, and then capturing one or more new intermediate entity webpages and/or the subject entity webpage from the captured intermediate entity webpages; and repeating the processing of the using the candidate entity webpages as the second head nodes and the capturing a plurality of intermediate entity webpages or the subject entity webpage to which the candidate entity webpages are pointed with the second head nodes as start, and capturing one or more new intermediate entity webpages and/or the subject entity webpage from the captured intermediate entity webpages, until a preset second capturing turn number is arrived and/or a preset second number of paths from the candidate entity webpages to the subject entity webpages are formed, wherein the intermediate entity webpages are used as the second intermediate nodes, and the subject entity webpage is used as the second sink node.

V. The electronic apparatus according to paragraph U, wherein the calculating weight values of the candidate entity webpages according to a relationship of a path between the candidate entity webpages and the subject entity webpage in the topological relationship graph includes:

assigning an initial first weight value to the first head node based on the forward topological relationship graph, performing weight value assignment by random walking according to the outdegrees of the nodes, until the preset first random walking turn number is arrived and/or the sink nodes are assigned with weight values, and using the weight values of the first sink nodes when the random walking based on the forward topological relationship graph is finished as the first intermediate weight values corresponding to the candidate entity webpages;

assigning initial second weight values to the second head nodes based on the backward topological relationship graphs, performing weight value assignment by random walking according to the outdegrees of the nodes, until a preset second random walking turn number is arrived and/or the second sink node is assigned with weight values, and using the weight values of the second sink nodes in the backward topological relationship graphs when the random walking based on the backward topological relationship graphs is finished as the second intermediate weight values of the candidate entity webpages in the backward topological relationship graphs; and using a weight value obtained by adding the first intermediate weight value and the second intermediate weight value of each candidate entity webpage as the weight value of the each candidate entity webpage

CONCLUSION

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A device, comprising:
    at least one processor; and
    memory including instructions that, when executed by the at least one processor, cause the at least one processor to perform operations to:
        search for a plurality of candidate entity webpages associated with an object value according to the object value;
        establish a topological relationship graph between a subject entity webpage and the plurality of candidate entity webpages in part by capturing one or more new intermediate entity webpages or the plurality of candidate entity webpages from a captured plurality of intermediate entity webpages, wherein the captured plurality of intermediate entity webpages are used as first intermediate nodes and a candidate entity webpage of the candidate entity webpages is used as a first sink node, and wherein the one or more new intermediate entity webpages are captured based on paths between a first head node and the first sink node;
        determine outdegrees for nodes in the topographical relationship graph between the first head node and each candidate entity webpage of the plurality of candidate entity webpages, wherein the outdegrees include a proportionate value for each edge leading from the first head node toward each candidate entity webpage;
        calculate weight values of the candidate entity webpages according to a relationship of a path between the candidate entity webpages and the subject entity webpage in the topological relationship graph, wherein the weight values represent sums of the outdegrees leading directly to each candidate entity webpage; and perform ranking on the weight values of the candidate entity webpages according to the weight values of the candidate entity webpages, and determine a value link corresponding to the object value according to a ranking result of the performed ranking.

2. The device according to claim 1, wherein the topological relationship graph comprises a forward topological relationship graph, and the forward topological relationship graph comprises the first head node, a first intermediate node, and the first sink node, the establishing a topological relationship graph between a subject entity webpage and the plurality of candidate entity webpages comprises:

until a preset first capturing turn number is arrived or a preset first number of paths from the subject entity webpage to the candidate entity webpages are formed:

using the subject entity webpage as the first head node, capturing the plurality of intermediate entity webpages or the candidate entity webpages to which the subject entity webpage is pointed with the subject entity webpage as a start.

3. The device according to claim 2, wherein the calculating weight values of the candidate entity webpages according to a relationship of a path between the candidate entity webpages and the subject entity webpage in the topological relationship graph comprises:

assigning an initial first weight value to the first head node, performing weight value assignment by random walking according to outdegrees of nodes, until a preset first random walking turn number is arrived or sink nodes are assigned with weight values; and acquiring weight values of the first sink nodes when the random walking is finished as the weight values of the candidate entity webpages.

4. The device according to claim 2, wherein the topological relationship graph further comprises a plurality of backward topological relationship graphs, and the backward topological relationship graph comprises a second head node, a second intermediate node and a second sink node, the establishing a topological relationship graph between a subject entity webpage and the plurality of candidate entity webpages further comprises:

establishing the plurality of backward topological relationship graphs from the candidate entity webpages to the subject entity webpage respectively as follows:

until a preset second capturing turn number is arrived or a preset second number of paths from the candidate entity webpages to the subject entity webpages are formed:

using the candidate entity webpages as second head nodes, capturing the plurality of intermediate entity webpages or the subject entity webpage to which the candidate entity webpages are pointed with the second head nodes as start; and capturing the one or more new intermediate entity webpages or the subject entity webpage from the captured plurality of intermediate entity webpages, wherein the captured plurality of intermediate entity webpages are used as second intermediate nodes, and the subject entity webpage is used as the second sink node, and wherein the one or more new intermediate entity webpages are captured based on paths between the second head nodes and the second sink node.

5. The device according to claim 4, wherein the calculating weight values of the candidate entity webpages according to a relationship of a path between the candidate entity webpages and the subject entity webpage in the topological relationship graph comprises:

assigning an initial first weight value to the first head node based on the forward topological relationship graph;

performing weight value assignment by random walking according to outdegrees of nodes until a preset first random walking turn number is arrived or sink nodes are assigned with weight values, and using the weight values of the first sink nodes when the random walking based on the forward topological relationship graph is finished as first intermediate weight values corresponding to the candidate entity webpages;

assigning initial second weight values to the second head nodes based on the backward topological relationship graphs;

performing weight value assignment by random walking according to outdegrees of nodes, until a preset second random walking turn number is arrived or the second sink node is assigned with weight values, and using the weight values of second sink nodes in the backward topological relationship graphs when the random walking based on the backward topological relationship graphs is finished as second intermediate weight values of the candidate entity webpages in the backward topological relationship graphs; and using a weight value obtained by adding a first intermediate weight value of the first intermediate weight values and a second intermediate weight value of the second intermediate weight values of each candidate entity webpage as the weight value of the each candidate entity webpage.

6. The device according to claim 1, wherein the searching for a plurality of candidate entity webpages associated with the object value according to an object value comprises:

performing matching searching on the object value and an anchor text in the webpage to acquire the plurality of candidate entity webpages associated with the object value.

7. A method, comprising:

searching for a plurality of candidate entity webpages associated with an object value according to the object value;

establishing a topological relationship graph between a subject entity webpage and the plurality of candidate entity webpages in part by capturing one or more new intermediate entity webpages or the plurality of candidate entity webpages from a captured plurality of intermediate entity webpages, wherein the captured plurality of intermediate entity webpages are used as first intermediate nodes and a candidate entity webpage of the candidate entity webpages is used as a first sink node, and wherein the one or more new intermediate entity webpages are captured based on paths between the first head node and a first sink node;

determining outdegrees for nodes in the topographical relationship graph between the first head node and each candidate entity webpage of the plurality of candidate entity webpages, wherein the outdegrees include a proportionate value for each edge leading from the first head node toward each candidate entity webpage;

calculating weight values of the candidate entity webpages according to a relationship of a path between the candidate entity webpages and the subject entity webpage in the topological relationship graph, wherein the weight values represent sums of the outdegrees leading directly to each candidate entity webpage; and performing ranking according to the weight values of the candidate entity webpages, and determining a value link corresponding to the object value according to a ranking result of the performed ranking.

8. The method according to claim 7, wherein the establishing a topological relationship graph between a subject entity webpage and the plurality of candidate entity webpages comprises:
establishing a forward topological relationship graph from the subject entity webpage to the plurality of candidate entity webpages, and/or establishing a plurality of backward topological relationship graphs from the candidate entity webpages to the subject entity webpage.

9. The method according to claim 8, wherein the calculating weight values of the candidate entity webpages according to a relationship of a path between the candidate entity webpages and the subject entity webpage in the topological relationship graph comprises: calculating the weight values of the candidate entity webpages by random walking.

10. The method according to claim 7, wherein the topological relationship graph comprises a forward topological relationship graph, and the forward topological relationship graph comprises the first head node, a first intermediate node, and the first sink node,
the establishing a topological relationship graph between a subject entity webpage and the plurality of candidate entity webpages comprises:
until a preset first capturing turn number is arrived or a preset first number of paths from the subject entity webpage to the candidate entity webpages are formed:
using the subject entity webpage as the first head node, capturing the plurality of intermediate entity webpages or the candidate entity webpages to which the subject entity webpage is pointed with the subject entity webpage as a start.

11. The method according to claim 10, wherein the calculating weight values of the candidate entity webpages according to a relationship of a path between the candidate entity webpages and the subject entity webpage in the topological relationship graph comprises:
assigning an initial first weight value to the first head node, performing weight value assignment by random walking according to outdegrees of nodes, until a preset first random walking turn number is arrived and/or sink nodes are assigned with weight values, and acquiring weight values of the first sink nodes when the random walking is finished as the weight values of the candidate entity webpages.

12. The method according to claim 10, wherein the topological relationship graph further comprises a plurality of backward topological relationship graphs, and the backward topological relationship graph comprises a second head node, a second intermediate node and a second sink node,
the establishing a topological relationship graph between a subject entity webpage and the plurality of candidate entity webpages further comprises: establishing the plurality of backward topological relationship graphs from the candidate entity webpages to the subject entity webpage respectively as follows:
until a preset second capturing turn number is arrived or a preset second number of paths from the candidate entity webpages to the subject entity webpages are formed:
using the candidate entity webpages as second head nodes, capturing the plurality of intermediate entity webpages or the subject entity webpage to which the candidate entity webpages are pointed with the second head nodes as start; and
capturing one or more new intermediate entity webpages or the subject entity webpage from the captured plurality of intermediate entity webpages, wherein the captured plurality of intermediate entity webpages are used as second intermediate nodes, and the subject entity webpage is used as the second sink node, and wherein the one or more new intermediate entity webpages are captured based on paths between the second head nodes and the second sink node.

13. The method according to claim 12, wherein the calculating weight values of the candidate entity webpages according to a relationship of a path between the candidate entity webpages and the subject entity webpage in the topological relationship graph comprises:
assigning an initial first weight value to the first head node based on the forward topological relationship graph;
performing weight value assignment by random walking according to outdegrees of nodes, until a preset first random walking turn number is arrived or sink nodes are assigned with weight values, and using the weight values of the first sink nodes when the random walking based on the forward topological relationship graph is finished as first intermediate weight values corresponding to the candidate entity webpages;
assigning initial second weight values to the second head nodes based on the backward topological relationship graphs;
performing weight value assignment by random walking according to outdegrees of nodes, until a preset second random walking turn number is arrived or the second sink node is assigned with weight values, and using the weight values of second sink nodes in the backward topological relationship graphs when the random walking based on the backward topological relationship graphs is finished as second intermediate weight values of the candidate entity webpages in the backward topological relationship graphs; and
using a weight value obtained by adding a first intermediate weight value of the first intermediate weight values and a second intermediate weight value of the second intermediate weight values of each candidate entity webpage as the weight value of the each candidate entity webpage.

14. An electronic apparatus, comprising:
a processing unit; and
a memory, coupled to the processing unit and containing instructions stored thereon, the instructions cause the electronic apparatus to perform operations upon being executed by the processing unit, the operations comprise:
searching for a plurality of candidate entity webpages associated with an object value according to the object value;
establishing a topological relationship graph between a subject entity webpage and the plurality of candidate entity webpages in part by capturing one or more new intermediate entity webpages or the plurality of candidate entity webpages from a captured plurality of intermediate entity webpages, wherein the captured plurality of intermediate entity webpages are used as first intermediate nodes and a candidate entity webpage of the candidate entity webpages is used as a first sink node, and wherein the one or more new intermediate entity webpages are captured based on paths between the first head node and the first sink node;

determining outdegrees for nodes in the topographical relationship graph between a first head node and each candidate entity webpage of the plurality of candidate entity webpages, wherein the outdegrees include a proportionate value for each edge leading from the first head node toward each candidate entity webpage;

calculating weight values of the candidate entity webpages according to a relationship of a path between the candidate entity webpages and the subject entity webpage in the topological relationship graph, wherein the weight values represent sums of the outdegrees leading directly to each candidate entity webpage; and performing ranking according to the weight values of the candidate entity webpages, and determining a value link corresponding to the object value according to a ranking result of the performed ranking.

15. The electronic apparatus according to claim 14, wherein the topological relationship graph comprises a forward topological relationship graph, and the forward topological relationship graph comprises the first head node, a first intermediate node, and the first sink node, the establishing a topological relationship graph between a subject entity webpage and the plurality of candidate entity webpages comprises:
until a preset first capturing turn number is arrived or a preset first number of paths from the subject entity webpage to the candidate entity webpages are formed:
using the subject entity webpage as the first head node, capturing the plurality of intermediate entity webpages and/or the candidate entity webpages to which the subject entity webpage is pointed with the subject entity webpage as a start.

16. At least one non-transitory machine-readable medium including instructions that, when executed by the at least one processor, cause the at least one processor to perform operations to:

search for a plurality of candidate entity webpages associated with an object value according to the object value;

establish a topological relationship graph between a subject entity webpage and the plurality of candidate entity webpages in part by capturing one or more new intermediate entity webpages or the plurality of candidate entity webpages from a captured plurality of intermediate entity webpages, wherein the captured plurality of intermediate entity webpages are used as first intermediate nodes and a candidate entity webpage of the candidate entity webpages is used as a first sink node, and wherein the one or more new intermediate entity webpages are captured based on paths between a first head node and the first sink node;

determine outdegrees for nodes in the topographical relationship graph between the first head node and each candidate entity webpage of the plurality of candidate entity webpages, wherein the outdegrees include a proportionate value for each edge leading from the first head node toward each candidate entity webpage;

calculate weight values of the candidate entity webpages according to a relationship of a path between the candidate entity webpages and the subject entity webpage in the topological relationship graph, wherein the weight values represent sums of the outdegrees leading directly to each candidate entity webpage; and perform ranking on the weight values of the candidate entity webpages according to the weight values of the candidate entity webpages, and determine a value link corresponding to the object value according to a ranking result of the performed ranking.

17. The at least one non-transitory machine-readable medium according to claim 16, wherein the topological relationship graph comprises a forward topological relationship graph, and the forward topological relationship graph comprises the first head node, a first intermediate node, and the first sink node, the establishing a topological relationship graph between a subject entity webpage and the plurality of candidate entity webpages comprises:
until a preset first capturing turn number is arrived or a preset first number of paths from the subject entity webpage to the candidate entity webpages are formed:
using the subject entity webpage as the first head node, capturing the plurality of intermediate entity webpages or the candidate entity webpages to which the subject entity webpage is pointed with the subject entity webpage as a start.

18. The at least one non-transitory machine-readable medium according to claim 17, wherein the calculating weight values of the candidate entity webpages according to a relationship of a path between the candidate entity webpages and the subject entity webpage in the topological relationship graph comprises:

assigning an initial first weight value to the first head node, performing weight value assignment by random walking according to outdegrees of nodes, until a preset first random walking turn number is arrived or sink nodes are assigned with weight values; and acquiring weight values of the first sink nodes when the random walking is finished as the weight values of the candidate entity webpages.

19. The at least one non-transitory machine-readable medium according to claim 17, wherein the topological relationship graph further comprises a plurality of backward topological relationship graphs, and the backward topological relationship graph comprises a second head node, a second intermediate node and a second sink node, the establishing a topological relationship graph between a subject entity webpage and the plurality of candidate entity webpages further comprises:
establishing the plurality of backward topological relationship graphs from the candidate entity webpages to the subject entity webpage respectively as follows:
until a preset second capturing turn number is arrived or a preset second number of paths from the candidate entity webpages to the subject entity webpages are formed:
using the candidate entity webpages as second head nodes, capturing the plurality of intermediate entity webpages or the subject entity webpage to which the candidate entity webpages are pointed with the second head nodes as start; and
capturing the one or more new intermediate entity webpages or the subject entity webpage from the captured plurality of intermediate entity webpages, wherein the captured plurality of intermediate entity webpages are used as second intermediate nodes, and the subject entity webpage is used as the second sink node, and wherein the one or more new intermediate entity webpages are captured based on paths between the second head nodes and the second sink node.

20. The at least one non-transitory machine-readable medium according to claim 19, wherein the calculating weight values of the candidate entity webpages according to a relationship of a path between the candidate entity webpages and the subject entity webpage in the topological relationship graph comprises:

assigning an initial first weight value to the first head node based on the forward topological relationship graph;

performing weight value assignment by random walking according to outdegrees of nodes until a preset first random walking turn number is arrived or sink nodes are assigned with weight values, and using the weight values of the first sink nodes when the random walking based on the forward topological relationship graph is finished as first intermediate weight values corresponding to the candidate entity webpages;

assigning initial second weight values to the second head nodes based on the backward topological relationship graphs;

performing weight value assignment by random walking according to outdegrees of nodes, until a preset second random walking turn number is arrived or the second sink node is assigned with weight values, and using the weight values of second sink nodes in the backward topological relationship graphs when the random walking based on the backward topological relationship graphs is finished as second intermediate weight values of the candidate entity webpages in the backward topological relationship graphs; and using a weight value obtained by adding a first intermediate weight value of the first intermediate weight values and a second intermediate weight value of the second intermediate weight values of each candidate entity webpage as the weight value of the each candidate entity webpage.

\* \* \* \* \*